United States Patent
Lee et al.

(10) Patent No.: US 10,003,682 B2
(45) Date of Patent: Jun. 19, 2018

(54) MOBILE TERMINAL AND METHOD FOR CONTROLLING THE SAME

(71) Applicant: LG Electronics Inc., Seoul (KR)

(72) Inventors: Seulah Lee, Seoul (KR); Yoonseok Yang, Seoul (KR); Juha Hyun, Seoul (KR); Shinnyue Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/182,351

(22) Filed: Jun. 14, 2016

(65) Prior Publication Data

US 2017/0064065 A1  Mar. 2, 2017

(30) Foreign Application Priority Data

Aug. 25, 2015 (KR) .......................... 10-2015-0119713

(51) Int. Cl.
*H04B 1/38* (2015.01)
*H04M 1/725* (2006.01)
*G06Q 10/10* (2012.01)
*H04B 1/3827* (2015.01)
*G06F 3/0481* (2013.01)

(52) U.S. Cl.
CPC ...... *H04M 1/72527* (2013.01); *G06Q 10/109* (2013.01); *H04B 1/385* (2013.01); *H04M 1/7253* (2013.01); *G06F 3/04817* (2013.01); *G06F 2203/0384* (2013.01); *H04M 1/72583* (2013.01); *H04M 2250/22* (2013.01)

(58) Field of Classification Search
CPC ... G06F 1/163; G06F 3/04817; G06Q 10/109; H04B 1/385; H04M 1/72527; H04M 1/7253; H04M 1/72583; H04W 88/00
See application file for complete search history.

(56) References Cited

U.S. PATENT DOCUMENTS

| | | | |
|---|---|---|---|
| 2013/0059547 A1* | 3/2013 | Kim | .................... H04M 1/6091 455/73 |
| 2014/0068516 A1* | 3/2014 | Escobedo | ............. G06F 3/0482 715/835 |
| 2014/0173459 A1* | 6/2014 | Gaiser | .................... H04L 67/22 715/753 |
| 2014/0320425 A1 | 10/2014 | Jeong et al. | |
| 2015/0045004 A1 | 2/2015 | Varadharajan | |
| 2015/0149301 A1* | 5/2015 | Dow | ................. G06Q 30/0273 705/14.69 |

(Continued)

FOREIGN PATENT DOCUMENTS

WO  2015105257 A1  7/2015

*Primary Examiner* — Xin Jia
(74) *Attorney, Agent, or Firm* — Dentons US LLP

(57) ABSTRACT

A mobile terminal and a method for controlling the same that may perform wireless communication with an external terminal are disclosed. The mobile terminal comprises a wireless communication unit configured to perform wireless communication with an external terminal; a touch screen outputting screen information; and a controller extracting event information included in the screen information on the basis of a user request and transmitting the extracted event information to the external terminal such that a notification screen corresponding to the event information is output from the external terminal prior to a predetermined time from a closing time of an event corresponding to the event information.

18 Claims, 17 Drawing Sheets

(56) References Cited

U.S. PATENT DOCUMENTS

2015/0205465 A1\* 7/2015 Robison ................ G06F 3/0484
715/744
2016/0147207 A1\* 5/2016 Park ....................... G08C 17/00
700/275

\* cited by examiner

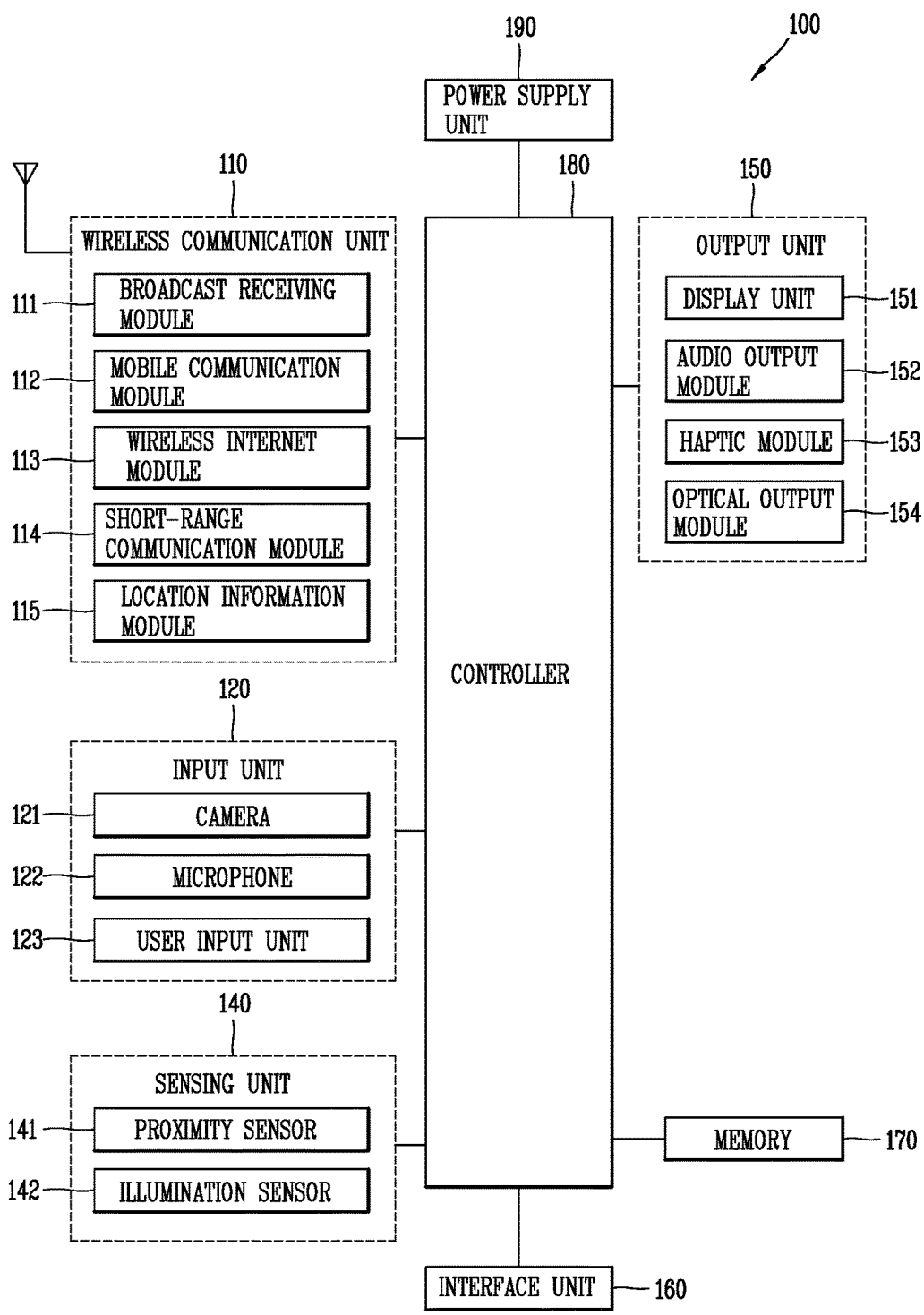

(a)

(b)

(a)　　　　　　　　(b)

(a)

(b)

(c)

(a)

(b)

(c)

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0119713, filed on Aug. 25, 2015, the contents of which is incorporated by reference herein in its entirety.

BACKGROUND OF THE INVENTION

1. Field of the Invention

The present invention relates to a mobile terminal and a method for controlling the same that may perform wireless communication with an external terminal.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, wearable devices have been actively developed. A mobile terminal may wirelessly be connected with a wearable device to enable mutual wireless communication.

In this respect, the need of the development of various user interfaces/user experiences (UI/UX) that mutually interwork a wearable device and a mobile terminal has been issued.

SUMMARY OF THE INVENTION

Therefore, an object of the present invention is to provide a mobile terminal and a method for controlling the same that optimally enables interworking with a wearable device.

Another object of the present invention is to provide a mobile terminal and a method for controlling the same that optimally notifies a user of event information related to an event selected therefrom.

To achieve these and other advantages and in accordance with the purpose of the invention, as embodied and broadly described herein, according to one embodiment of the present invention, a mobile terminal comprises a wireless communication unit configured to perform wireless communication with an external terminal; a touch screen outputting screen information; and a controller extracting event information included in the screen information on the basis of a user request and transmitting the extracted event information to the external terminal such that a notification screen corresponding to the event information is output from the external terminal prior to a predetermined time from a closing time of an event corresponding to the event information.

According to the embodiment, the controller extracts the event information on the basis of at least one of capturing for the screen information output to the touch screen and a predetermined touch applied to the screen information.

According to the embodiment, the controller outputs a graphic object associated with a function of extracting event information if the screen information is captured after a predetermined touch is applied to the screen information output to the touch screen and extracts event information displayed on an area to which the predetermined touch is applied, from the screen information based on that a touch is applied to the graphic object.

According to the embodiment, the event information includes link information associated with the screen information, an icon corresponding to the link information is output to a notification screen corresponding to event information output to a touch screen of the external terminal, and the controller outputs screen information associated with the link information to the touch screen on the basis of link information corresponding to the icon if the icon is selected from the external terminal.

According to the embodiment, the controller controls the touch screen to output the notification screen corresponding to the event information prior to the predetermined time from the closing time of the event corresponding to the extracted event information.

According to the embodiment, an icon corresponding to link information associated with the screen information is output to the notification screen corresponding to the event information, and if the icon is selected, the controller outputs the screen information associated with the link information to the touch screen on the basis of the link information corresponding to the icon.

According to the embodiment, the mobile terminal further comprises a main body configured to be worn on a wrist of a user.

According to the embodiment, if event information is received from the external terminal, the controller controls the touch screen to output a notification screen corresponding to the event information prior to the predetermined time from a closing time of an event corresponding to the received event information.

According to the embodiment, an icon corresponding to link information associated with specific screen information is output to the notification screen corresponding to the event information, and if the icon is selected, the controller transmits link information corresponding to the icon to the external terminal such that the specific screen information is output to the touch screen of the external terminal.

According to the embodiment, the event information includes information related to payment, an icon corresponding to the information related to payment is output to the notification screen corresponding to the event information, and the controller outputs the information related to payment to the touch screen based on that the icon corresponding to the information related to payment is selected.

According to the embodiment, an indicator indicating a sold-out estimated time of an item for payment is displayed on the touch screen.

According to the embodiment, a graphic object that may change the item for payment is displayed on the touch screen, and if the item for payment is changed through the graphic object, the controller displays an indicator indicating a sold-out estimated time of the changed item on the touch screen.

According to the embodiment, the controller generates additional alarm if a current time reaches a time prior to a specific time from the sold-out estimated time.

According to the embodiment, the controller receives a plurality of kinds of event information through the wireless communication unit, and performs different operations in accordance with a touch mode applied to the touch screen in a state that a notification screen corresponding to any one of the plurality of kinds of event information is output to the touch screen.

According to the embodiment, the controller changes the notification screen corresponding to the any one kind of event information to a notification screen corresponding to another event information if a first touch is applied to the touch screen, and restricts output of the notification screen corresponding to the any one kind of event information and outputs a plurality of icons related to the plurality of kinds of event information to the touch screen if a second touch different from the first touch is applied to the touch screen.

According to the embodiment, an indicator indicating the number of the plurality of kinds of event information is displayed on the touch screen.

According to one embodiment of the present invention, a method for controlling a mobile terminal comprises the steps of outputting screen information; extracting event information included in the screen information on the basis of a user request; and transmitting the extracted event information to an external terminal such that a notification screen corresponding to the event information is output from the external terminal prior to a predetermined time from a closing time of an event corresponding to the event information.

According to the embodiment, the user request is at least one of capturing for the screen information output to the touch screen and a predetermined touch applied to the screen information.

According to the embodiment, the step of extracting event information includes outputting a graphic object associated with a function of extracting event information if the screen information is captured after a predetermined touch is applied to the screen information output to the touch screen and extracting event information displayed on an area to which the predetermined touch is applied, from the screen information based on that a touch is applied to the graphic object.

According to the embodiment, the event information includes link information associated with the screen information, an icon corresponding to the link information is output to a notification screen corresponding to event information output to a touch screen of the external terminal, and the method further comprises the step of outputting screen information associated with the link information to the touch screen on the basis of link information corresponding to the icon if the icon is selected from the external terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1a is a block diagram illustrating a mobile terminal according to the present invention;

DETAILED DESCRIPTION OF THE INVENTION

Figure 1B:
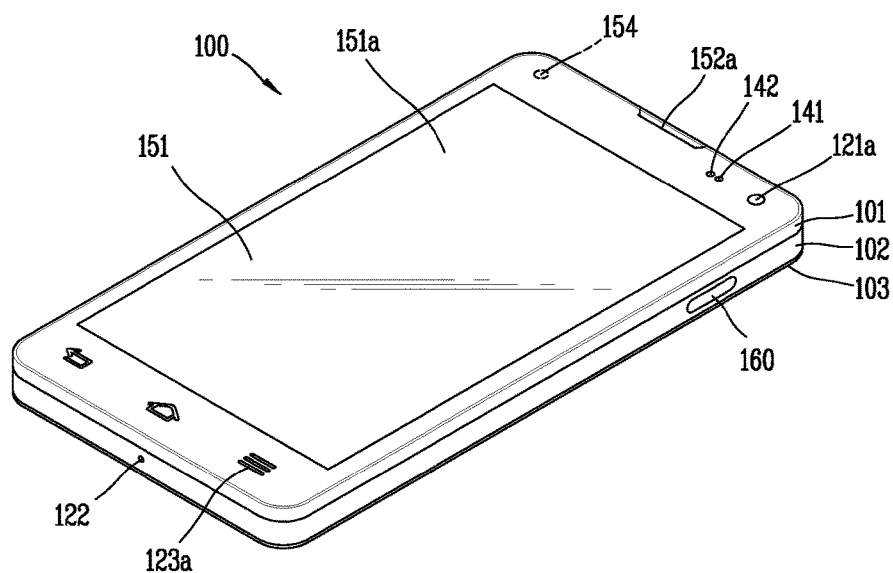
FIGS. 1b and 1c are conceptual views illustrating an example of a mobile terminal according to the present invention, which is viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
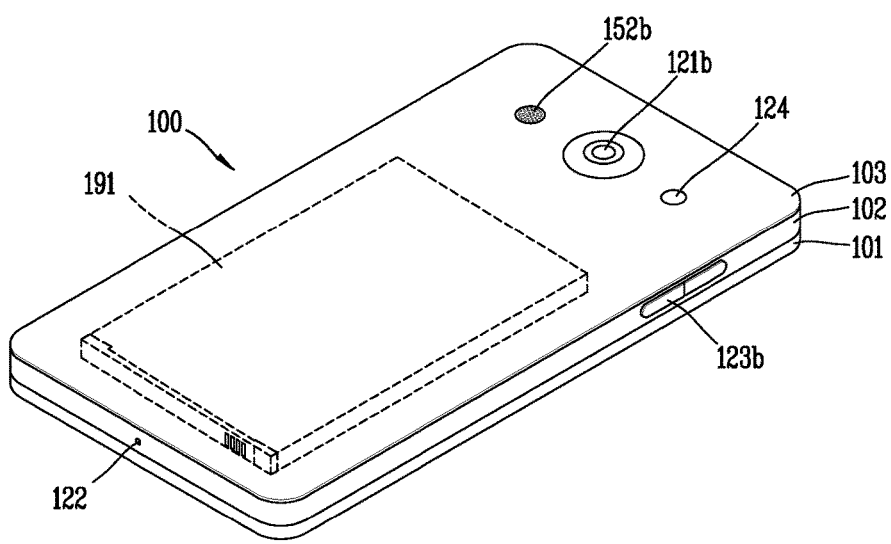

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 121, which is one type of audio input device for inputting an audio signal, and a user input unit 122 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 121, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 122 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1O, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 may be a wearable device 100 such as a smart watch, a smart glass, a head mounted display (HMD), etc.

For instance, a mobile terminal can exchange data with the wearable device 100. The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
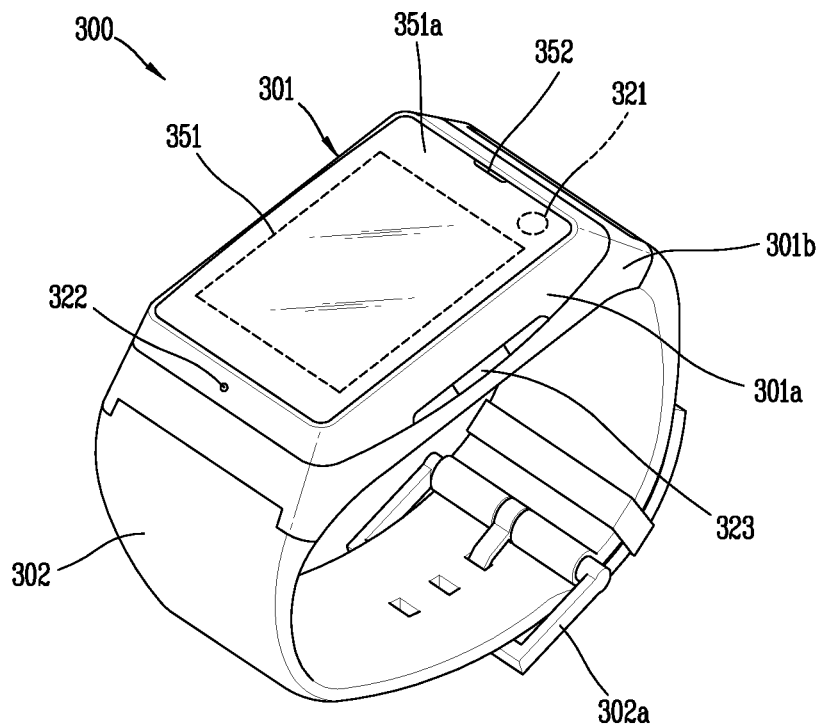
FIG. 2 is a conceptual view illustrating an example of a watch type mobile terminal according to the present invention, which is viewed from one direction.

FIG. 2 is a perspective view illustrating one example of a watch-type wearable device 300 in accordance with another exemplary embodiment.

As illustrated in FIG. 2, the watch-type wearable device 300 includes a main body 301 with a display unit 351 and a band 302 connected to the main body 301 to be wearable on a wrist. In general, wearable device 300 may be configured to include features that are the same or similar to that of the mobile terminal 100 of FIGS. 1A to 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a watch-type wearable device 300 with a uni-body.

The watch-type wearable device 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 202 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

The mobile terminal 100 according to one embodiment of the present invention, which may include at least one of the aforementioned elements, may wirelessly be connected with an external terminal 300 to perform wireless communication. Such wireless communication may be performed through a wireless communication unit provided in the mobile terminal 100 and the external terminal 300. The wireless communication unit may be the wireless communication unit 110 described in FIG. 1a. Wireless communication between the mobile terminal 100 and the external terminal 300 may be performed using the aforementioned near-field communication (NFC) technology.

The external terminal 300 may be at least one of the aforementioned wearable devices. Hereinafter, the external terminal 300 which is the watch type mobile terminal described in FIG. 2 will be described exemplarily.

Meanwhile, the description of the mobile terminal which will be made hereinafter may equally/similarly be applied to the watch type mobile terminal (external terminal).

For example, if the mobile terminal is a bar type mobile terminal with the type of FIGS. 1b and 1c, the external terminal may be the watch type mobile terminal with the type of FIG. 2. Also, if the mobile terminal is a watch type mobile terminal with the type of FIG. 2, the external terminal may be the bar type mobile terminal described in FIGS. 1b and 1c.

First of all, the mobile terminal which is the bar type mobile terminal with the type of FIGS. 1b and 1c and the external terminal which is the watch type mobile terminal with the type of FIG. 2 will be described with reference to FIGS. 2 and 5c.

The mobile terminal 100 according to the present invention may transmit various kinds of information (data, files, signals, etc.) to the external terminal 300 through the wireless communication unit 110. To this end, the mobile terminal 100 and the external terminal 300 may wirelessly be connected with each other to enable wireless communication. Meanwhile, if there is a request for transmission of information based on a user request, the mobile terminal 100, although not wirelessly connected with the external terminal 300, may transmit the information to the external terminal 300 through the wireless communication unit 110. If there is a request for reception of information, the external terminal 300 may receive the transmitted information through the wireless communication unit.

Meanwhile, the present invention may provide various control methods through wireless communication between the mobile terminal 100 and the external terminal 300.

Hereinafter, a control method for providing information related to an event through interworking between an external terminal and a mobile terminal according to the present invention will be described in more detail with reference to the accompanying drawings.

Figure 3:
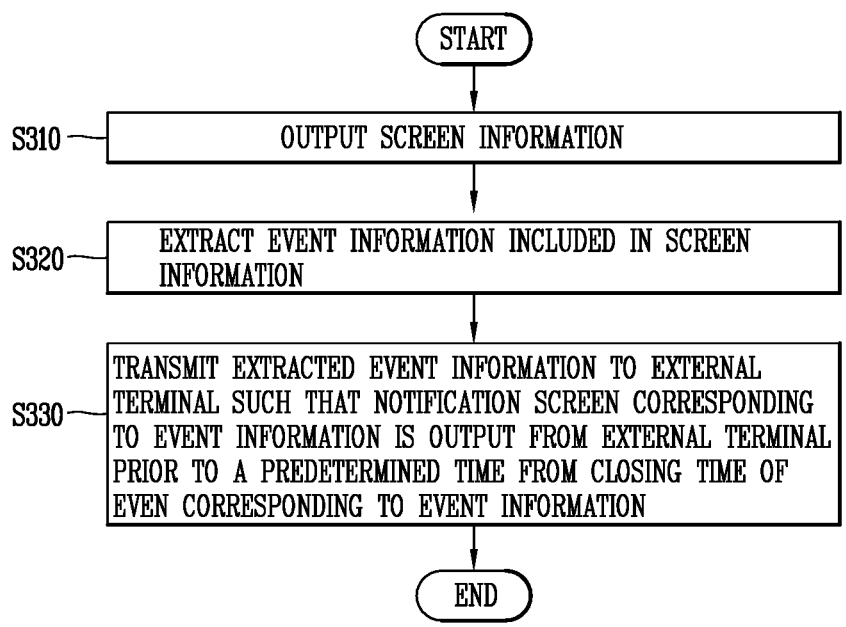
FIG. 3 is a flow chart illustrating a control method according to the present invention.
Figure 4:
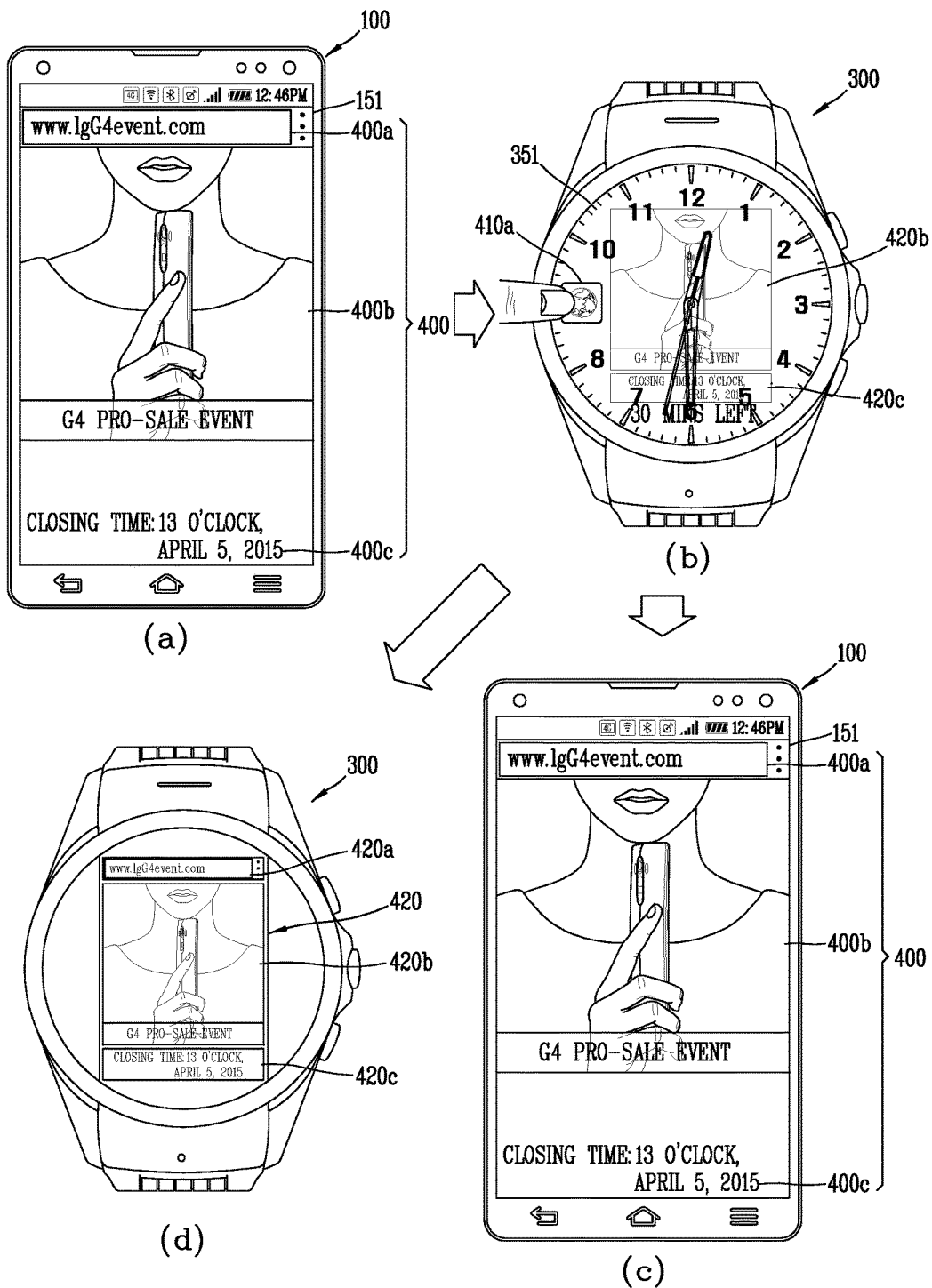
FIG. 4 is a conceptual view illustrating the control method of FIG. 3.

FIG. 3 is a flow chart illustrating a control method according to the present invention, and FIG. 4 is a conceptual view illustrating the control method of FIG. 3.

First of all, in the present invention, screen information is output to a touch screen 151 (S310).

The mobile terminal 100 according to the present invention may be provided with the touch screen 151. Various kinds of screen information may be output to the touch screen 151. The screen information may include all kinds of screens that may be output from the mobile terminal 100. In this case, the touch screen 151 may be an on-state.

Afterwards, in the present invention, event information included in the screen information is extracted. In more detail, the controller 180 may extract the event information included in the touch screen 151 on the basis of a user request.

The event information described in this specification means information related to an event (or promotion, advertisement, marketing, event, planning event, payment, and item for payment) having a closing time (due date, deadline, etc.) running on offline/online. The event information may include a closing time (due date, deadline, etc.) of an event, an event type, image related to an event, link information (for example, information configured to run URL address or application connected to screen information (for example, web page) related to an event), information related to payment, etc.

The user request may be at least one of capturing of screen information output to the touch screen and a predetermined touch applied to the screen information.

In more detail, the controller 180 may extract the event information included in the screen information on the basis of capturing of the screen information output to the touch screen 151.

As described above, for example, an optical character reader/recognition (OCR) function may be used to extract the event information from the screen information. For example, the controller 180 may use the OCR function if the screen information output to the touch screen 151 is a type of an image or the event information is extracted from captured screen information (image). The OCR function may mean conversion of image (image corresponding to text) to text.

Capturing the screen information may mean that the screen information output to the touch screen 151 is stored in a type of image (or moving image). The capturing (or capturing function, capturing operation) may be performed in various manners. For example, the controller 180 may capture the screen information output to the touch screen on the basis of a user input given to at least one of a hardware key and a software key.

For another example, the controller 180 may capture the screen information on the basis of selection of a graphic object (icon, image), which is associated with the capturing function of screen information.

For still another example, the controller 180 may enter a mode for inputting information corresponding to a touch trace to the screen information on the basis of selection of a graphic object, which is associated with a function of entering the above mode. If the controller 180 enters the above mode, at least one of a function button for application of a graphic effect of screen information which is being output prior to entering the mode and information corresponding to the touch trace and a memory button associated with a function of storing at least one of screen information output to the touch screen 151 in the above mode and information corresponding to the touch trace as one image may be displayed on the touch screen 151. The controller 180 may capture the screen information on the basis of selection of the memory button.

Also, the controller 180 may extract the event information included in the screen information on the basis of the predetermined touch applied to the screen information.

The predetermined touch is a touch for performing a function of extracting event information from screen information output to the touch screen, and may include various kinds of touches.

For example, examples of the various kinds of touches may include a short (or tap) touch, a long touch, a double touch, a multi touch, a drag touch, a flick touch, a pinch-in touch, a pinch-out touch, a swype touch, and a hovering touch.

Hereinafter, the various kinds of touches will be described in more detail. The short (or tap) touch may be a touch which is released within a certain time after a touch target (for example, finger or stylus pen) touches the touch screen 151. For example, the short (or tap) touch may be a touch, which a touch target touches the touch screen 151 for a short time, such as a single click of a mouse.

The long touch may be a touch which is maintained for a certain time or more after a touch target touches the touch screen 151. For example, the long touch may be a touch which is maintained for a certain time or more after the touch screen 151 is touched by a touch target. In more detail, the long touch may be a touch released after the touch is maintained at one point on the touch screen for a certain time or more. Also, the long touch may be understood as a touch corresponding to a touch and hold operation that maintains a touch state of a touch target on the touch screen 151 for a certain time or more.

The double touch may be a touch which the short touch is applied onto the touch screen 151 continuously at least two times within a certain time.

The certain time described in the short touch, the long touch and the double touch may be determined by a user setup.

The multi touch may be a touch applied to at least two touch points on the touch screen 151 at the substantially same time.

The drag touch may be a touch which a touch starting from a first point of the touch screen 151 is continuously applied along one direction on the touch screen and released at a second point different from the first point.

In more detail, the drag touch may be a touch which a touch applied to one point of the touch screen 151 by a touch target is extended continuously in a state that the corresponding touch is maintained on the touch screen 151 and then released at another point different from the one point.

Also, the drag touch may mean a touch extended continuously from a touch applied to one point of the touch screen 151.

The flick touch may be a touch to which the drag touch is applied within a certain time. In more detail, the flick touch may be a touch which a touch target that performs the drag touch is released from the touch screen 151 within a certain time. In other words, the flick touch may be understood as a drag touch applied at a speed more than a predetermined speed.

The swype touch may be a drag touch applied in a straight line.

The pinch-in touch may be a touch which at least one of first and second touches applied to two different points (two points spaced apart from each other) on the touch screen 151 is extended to be close to the other one. For example, the pinch-in touch may be a touch achieved by an operation for making an interval of respective fingers be narrow in a state that the fingers touch the two points spaced apart from each other on the touch screen 151.

The pinch-out touch may be a touch which at least one of first and second touches applied to two different points (two points spaced apart from each other) on the touch screen 151 is extended to be far away from the other one. For example, the pinch-out touch may be a touch corresponding to an operation for making an interval of respective fingers be wide in a state that the fingers touch the two points spaced apart from each other on the touch screen 151.

The hovering touch may be a touch corresponding to an operation of a touch target on a space far away from the touch screen 151 while the touch target does not touch the touch screen 151, and, for example, may be the proximity touch described in FIG. 1. For example, the hovering touch may be a touch corresponding to an operation of the touch target maintained at one point spaced apart from the touch screen 151 for a certain time or more.

Hereinafter, the predetermined touch associated with the function of extracting event information, which is the drag touch, will be described exemplarily. However, the aforementioned various kinds of touches may equally/similarly be applied to the predetermined touch.

For another example, the controller 180 may extract event information included in the screen information through combination of the aforementioned capturing and the predetermined touch.

In more detail, if the screen information is captured after the predetermined touch is applied to the screen information on the touch screen 151, the controller 180 may output a graphic object (button, image, icon, etc.) associated with the function of extracting event information.

Afterwards, the controller 180 may extract event information displayed on an area to which the predetermined touch is applied, from the screen information based on that a touch is applied to the graphic object (This case will be described in more detail with reference to FIG. 5a).

If the event information is extracted, the extracted event information is transmitted to the external terminal such that a notification screen corresponding to the event information is output from the external terminal prior to a predetermined time from a closing time of an event corresponding to the event information.

In more detail, the notification screen is an example of the screen information and is generated on the basis of the extracted event information, and may be screen information for notifying the event information. The notification screen may include at least a part of the screen information output to the touch screen 151 of the mobile terminal 100.

The predetermined time may be set by a user. For example, if the predetermined time is 30 minutes and the closing time of the event is 14:00, the external terminal 300 may output a notification screen corresponding to the event information to the touch screen 151 at 13:30 prior to the predetermined time from the closing time of the event.

To perform the above operation, the controller 180 may transmit the extracted event information to the external terminal through the wireless communication unit 110. Also, the controller 180 may generate a notification screen output from the external terminal by using the extracted event information, and may transmit the generated notification screen to the external terminal through the wireless communication unit 110.

However, without limitation to the above example, the controller 380 of the external terminal 300 may generated the notification screen by using event information received from the mobile terminal 100.

The predetermined time may be set by the external terminal 300 or the mobile terminal 100, or may be varied by user setup. If the predetermined time is set by the mobile terminal 100, the event information transmitted to the external terminal 300 may include information related to the predetermined time which is set.

The aforementioned description will be understood more clearly with reference to FIG. 4.

As shown in (a) of FIG. 4, screen information 400 may be displayed on the touch screen 151 of the mobile terminal 100. The screen information 400 may include information related to an event, for example, link information 400a associated with the screen information related to the event, an image 400b related to the event, and a deadline 400c of the event.

The controller 180 may extract event information included in the screen information 400 on the basis of a user request. The event information may include link information 400a associated with the screen information related to the event, an image 400b related to the event, and a deadline 400c of the event, as described above.

The user request, for example, may mean that the screen information displayed on the touch screen is captured or a predetermined touch is applied to the screen information.

Also, if the screen information 400 is captured after the predetermined touch is applied to the screen information, the controller 180 may output a graphic object associated with a function of extracting event information, and if the graphic object is selected, may extract event information included in the screen information 400 from the screen information on the basis of an area to which the predetermined touch is applied.

Afterwards, the controller 180 may transmit the extracted event information 400 to the external terminal 300 such that the notification screen corresponding to the event information may be output from the external terminal 300 prior to a predetermined time from a closing time of an event corresponding to the event information. The extracted event information may be transmitted based on that the event information is extracted, or may be transmitted if there is a separate request for transmission.

As shown in (b) of FIG. 4, if a current time reaches a time prior to a predetermined time from a closing time of the event, the controller 380 of the external terminal 300 may output the notification screen corresponding to the event information on the basis of the received event information.

The notification screen may include an image 410b related to the event, a closing time 410c of the event, and an icon 410a corresponding to link information associated with the screen information from which the event information is extracted.

In more detail, the event information transmitted from the mobile terminal 100 to the external terminal 300 may include link information 400a associated with the screen information.

Also, the icon 410a corresponding to the link information may be output to the notification screen corresponding to the event information output to a touch screen 351 of the external terminal 300.

If the icon 410a output to the touch screen 351 of the external terminal 300 is selected (touched), the controller 380 of the external terminal 300 may transmit a signal indicating that the icon 410a has been selected, to the mobile terminal 100 through the wireless communication unit.

If the icon 410a is selected by the external terminal 300 as shown in (c) of FIG. 4, the controller 180 of the mobile terminal 100 may output the screen information 400 associated with the link information to the touch screen 151 on the basis of the link information corresponding to the icon 410a.

That is, the screen information 400 associated with the link information may be the screen information from which event information is extracted, as shown in (a) of FIG. 4.

However, without limitation to the above example, in the present invention, if the icon 410a corresponding to the link information output to the touch screen 351 of the external terminal 300 is selected, the screen information (that is, screen information in which event information is extracted from the mobile terminal) associated with the link information may be output to the touch screen 351 of the external terminal 300. At this time, the screen information output to the touch screen 351 of the external terminal 300 may include at least a part of screen information (web page) in which event information is extracted from the mobile terminal 100.

For example, the screen information output to the touch screen 351 of the external terminal 300 may include link information 420a associated with screen information, an image 420b related to an event, and a deadline 420c of an event. The screen information may be a web site corresponding to the event information.

That is, based on that the icon 410a is selected, the screen information 420 output to the external terminal 300 and the screen information output to the mobile terminal 100 may be the same as each other, or may partially be different from each other.

The aforementioned description may equally/similarly be applied to even a case where the mobile terminal is a watch type mobile terminal 300 and the external terminal is a bar type mobile terminal 100 (that is, reverse case). That is, the watch type mobile terminal 300 may extract event information by using screen information output to a touch screen 351 of the watch type mobile terminal 300, and may transmit the extracted event information to the bar type mobile terminal such that notification information corresponding to the event information may be output to a touch screen of the bar type mobile terminal prior to a closing time of an event corresponding to the extracted event information.

Meanwhile, the mobile terminal according to the present invention may output a notification screen corresponding to the event information to the touch screen 151 of the mobile terminal 100 prior to a closing time of an event corresponding to the event information without limitation to transmission of the extracted event information to the external terminal.

Although not shown, the controller 180 may extract event information included in the screen information output to the touch screen 151. Also, the controller 180 may control the touch screen 151 such that the notification screen corresponding to the event information may be output prior to a predetermined time from a closing time of an event corresponding to the extracted event information.

In the same manner as the description made with reference to FIG. 4, an icon corresponding to link information associated with screen information from which the event information is extracted may be output to the notification screen corresponding to the event information.

If the icon included in the notification screen is selected (touched), the controller 180 may output the screen information associated with the link information to the touch screen 151 on the basis of the link information corresponding to the icon. The screen information associated with the link information may be screen information from which the event information is extracted.

Hereinafter, the mobile terminal which is the watch type mobile terminal 300 will be described exemplarily. In this case, the external terminal may be the aforementioned bar type mobile terminal 100.

The watch type mobile terminal (mobile terminal) may be provided with a main body configured to be worn on a wrist of a user.

If event information is received from the external terminal 100, the controller 380 of the watch type mobile terminal 300 may control the touch screen 351 such that a notification screen corresponding to the event information may be output prior to a predetermined time from a closing time of an event corresponding to the received event information.

The event information received from the external terminal 100 may include link information associated with screen information from which the event information is extracted.

An icon corresponding to link information associated with specific screen information may be output to the notification screen corresponding to the event information output to the touch screen 351. The specific screen information may be screen information in which event information is extracted from the external terminal 100.

If the icon is selected, the controller 380 of the watch type mobile terminal 300 may transmit link information (that is, link information associated with specific screen information) corresponding to the icon to the external terminal 100 such that the specific screen information may be output to the touch screen 151 of the external terminal 100.

The external terminal 100 that has received the link information may output the screen information associated with the link information to its touch screen 151 by using the link information.

For another example, if the icon is selected, the controller 380 of the watch type mobile terminal 300 may control the touch screen 351 of the watch type mobile terminal 300 such that the specific screen information may be output.

Through the aforementioned configuration, in the present invention, notification of an event in which a user is interested may be output from the external terminal (watch type mobile terminal) prior to a predetermined time, whereby an optimized user interface may be provided to directly output screen information (screen information corresponding to event information) related to a corresponding event to the external terminal (watch type mobile terminal) or the mobile terminal.

Hereinafter, various embodiments for extracting event information in the present invention will be described in more detail with reference to the accompanying drawings.

Figure 5A:
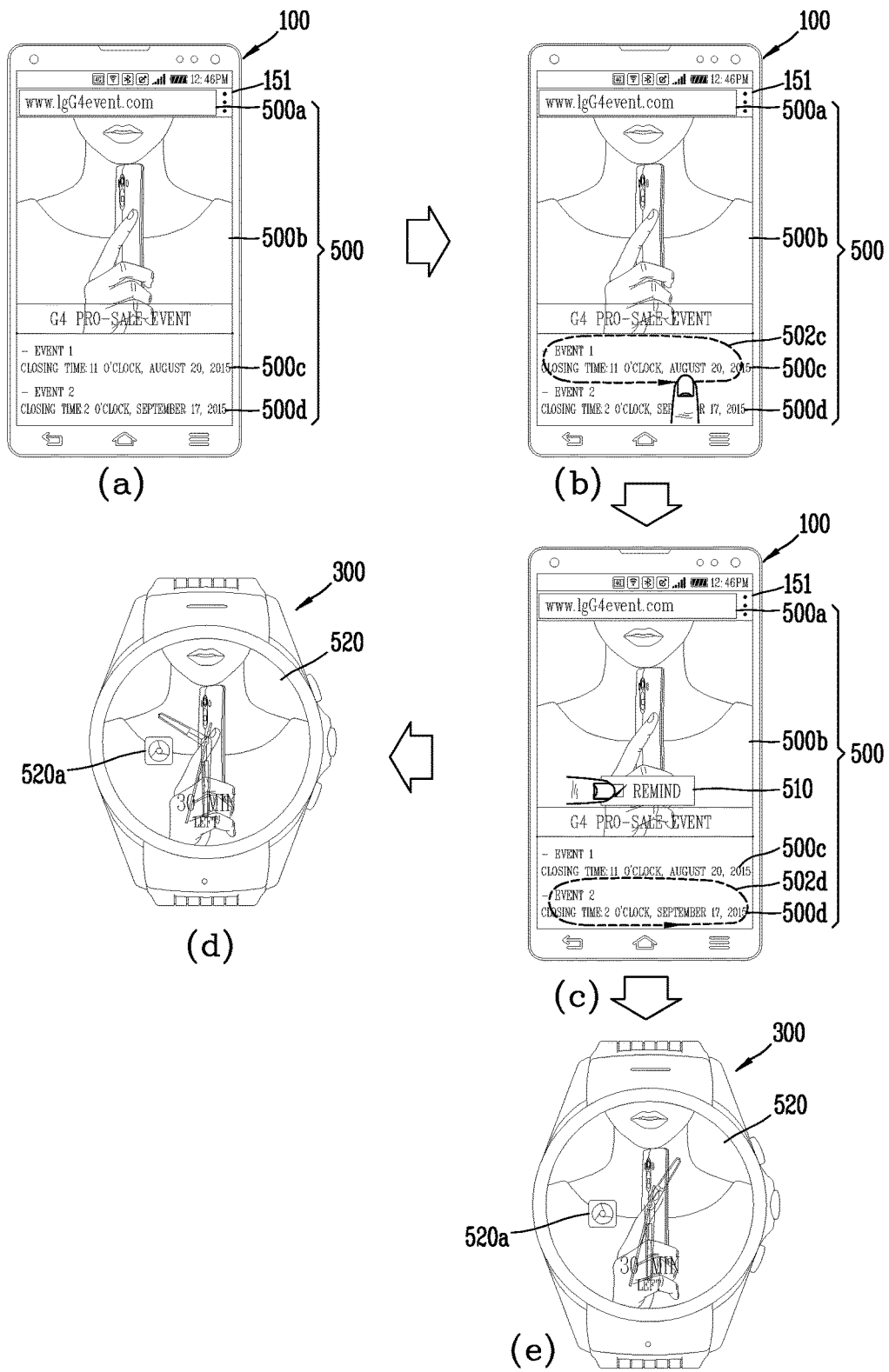
FIGS. 5a, 5b and 5c are conceptual views illustrating a method for extracting event information from a mobile terminal according to one embodiment of the present invention.
Figure 5B:
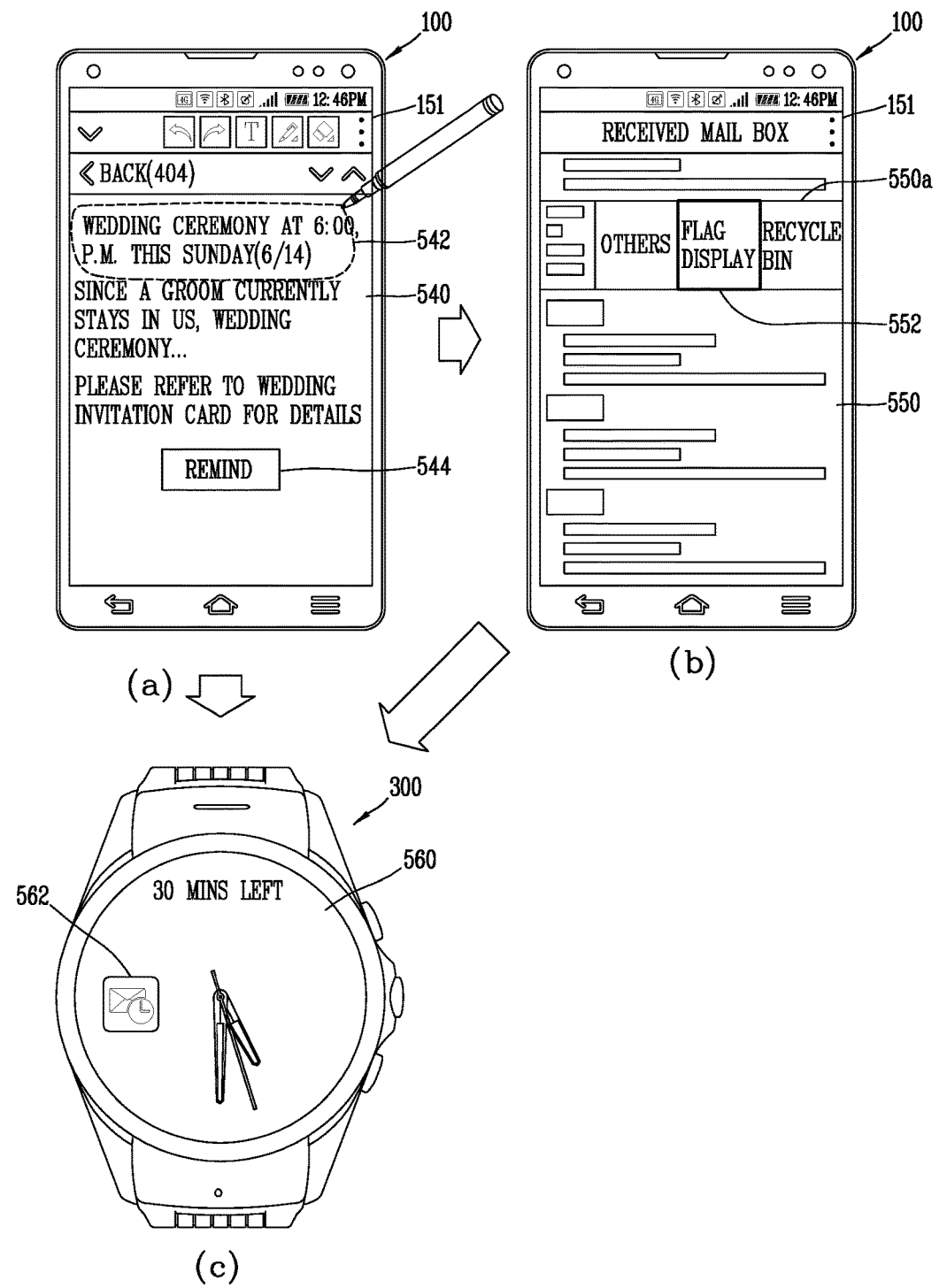
Figure 5C:
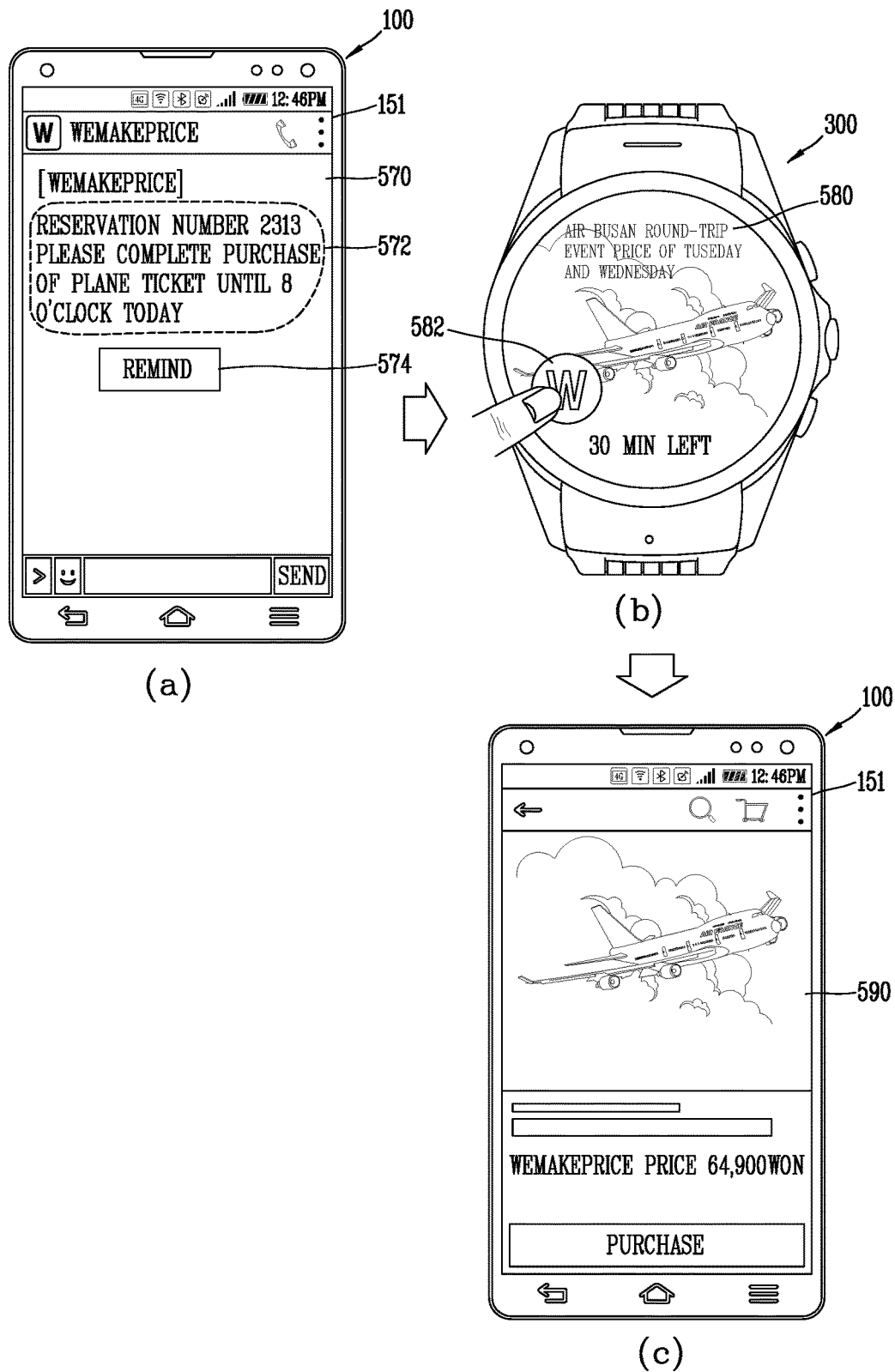

FIGS. 5a, 5b and 5c are conceptual views illustrating a method for extracting event information from a mobile terminal according to one embodiment of the present invention.

As shown in (a) of FIG. 5a, screen information 500 may be output to the touch screen 151 of the mobile terminal 100. The screen information 500 may include event information (link information 500a associated with screen information, an image 500b related to an event, and closing time 500c and 500d of an event).

For example, the controller 180 may output event information included in the screen information 500 on the basis of at least one of capturing of the screen information 500 output to the touch screen 151 and a predetermined touch applied to the screen information.

For another example, if the screen information 500 is captured after a predetermined touch (for example, drag touch) 502c is applied as shown in (b) of FIG. 5a, the controller 180 may extract a graphic object 510 associated with a function of extracting the event information included in the captured screen information as shown in (c) of FIG. 5a.

If the graphic object 510 is selected (if a touch is applied), the controller 180 may extract the event information included in the screen information 500. At this time, the controller 180 may extract event information 500c (information on a closing time of an event) displayed on an area to which the predetermined touch 502c is applied, from the event information included in the screen information 500.

At this time, the controller 180 may be formed to basically (regardless of drag touch) extract the link information 500a associated with the screen information and the image 500b related to an event.

In more detail, the screen information 500 may include information 500c and 500d on a plurality of closing times. At this time, if the screen information is captured after the predetermined touch 502c (for example, drag touch) is applied to any one 500c of the information on the plurality of closing times (deadline), the controller 180 may extract only information on any one of the closing times to which the predetermined touch is applied, from the information on the plurality of closing times.

If the predetermined touches 502c and 502d are respectively to the information 500c and 500d on the plurality of closing times, the controller 180 may extract every information on the plurality of closing times.

The information (event information) on the closing time, to which the predetermined touch is applied, may be extracted on the basis of selection of the graphic object 510 output based on capturing for the screen information, and if the information may be extracted based on that the predetermined touch is released, the information may be extracted based on capturing for the screen information after the predetermined touch is applied.

Afterwards, as shown in (d) and (e) of FIG. 5a, the controller 180 may transmit the extracted event information to the external terminal 300 through the wireless communication unit 110 such that a notification screen 520 corresponding to the event information may be output from the external terminal 300 prior to a predetermined time from the closing time (deadline) of the event corresponding to the extracted even information.

At this time, if a plurality of kinds of information on the closing time of the event are included in the event information, the external terminal 300 may output the notification screen 520 corresponding to the event information prior to a predetermined time (for example, 30 minutes) from the closing times (for example, 11:00 on Aug. 20, 2015 and 2:00 on Sep. 17, 2015) of each event, as shown in (d) and (e) of FIG. 5a.

An icon 520a corresponding to the link information 500a associated with the screen information 500 from which the event information is extracted may be displayed on the notification screen 520. If the icon 520a is selected from the external terminal 300, the screen information 500 associated with the link information 500a may be displayed on at least one of the touch screen 151 of the mobile terminal 100 and the touch screen 351 of the external terminal 300 on the basis of the link information 500a corresponding to the icon 520a.

An example that event information is extracted from screen information corresponding to a web page has been exemplarily described in FIG. 5a.

Meanwhile, the aforementioned description may equally/similarly be applied to even the state that running screens of various kinds of applications such as an application related to mail and an application related to social commerce are output.

An example of the application related to mail is shown in FIG. 5b.

As shown in (a) of FIG. 5b, the screen information 540 related to mail may be output to the touch screen 151 of the mobile terminal. If a predetermined touch 542 is applied to the screen information 540, the controller 180 may output a graphic object 544 associated with a function of extracting event information displayed on an area to which the predetermined touch is applied. The controller 180 may extract link information (for example, information for outputting the screen information 540 from which the event information is extracted) associated with the screen information 540, information related to a closing time displayed on the area to which the predetermined touch is applied, etc. on the basis of selection of the graphic object 544. Afterwards, the controller 180 may transmit the extracted information to the external terminal 300 such that the external terminal may output a notification screen corresponding to the event information prior to a predetermined time from a closing time of an event corresponding to the event information.

For example, as shown in (b) of FIG. 5b, if a touch is applied to a specific graphic object 552 that may be displayed on a mail list after the predetermined touch 542 is applied to the screen information 540, the controller 180 may extract event information displayed on the area to which the predetermined touch 542 is applied and link information associated with the screen information to which the predetermined touch is applied. The specific graphic object 552 may be a graphic object associated with a function of extracting event information displayed on the area to which the predetermined touch is applied, or may be a graphic object for identifying importance of the mail. The controller 180 may transmit the extracted event information to the external terminal 300 based on that the event information is extracted (or based on that the specific graphic object 552 is selected).

Afterwards, the external terminal 300 may display notification information 560 corresponding to the event information on the basis of information on a closing time, which is included in the received event information, prior to a predetermined time from the closing time. An icon 562 corresponding to link information associated with the screen information may be displayed on the notification information.

If the icon 562 is selected from the external terminal 300, the controller 180 of the mobile terminal 100 may output the screen information 540, which is associated with link information corresponding to the icon 562, to the touch screen 151.

An example of the application related to social commerce is shown in FIG. 5c.

If a request of a purchase for a specific product is performed by the application related to social commerce, as shown in (a) of FIG. 5c, a message which includes information related to the specific product may be received from an external server that provides a social commerce service.

As shown in (a) of FIG. 5c, if a predetermined touch 572 is applied to the touch screen 151 in a state that screen information 570 corresponding to the above message is output to the touch screen 151, the controller 180 may output a graphic object 574 associated with a function of extracting event information displayed on an area to which the predetermined touch 572 is applied, from the screen information 570.

If the graphic object 574 is selected, the controller 180 may extract event information (information related to a closing time) displayed on the area to which the predetermined touch 572 is applied and link information (for example, information for connection to a page (screen) where the specific product is purchased through the social commerce application) associated with the screen information.

Afterwards, the controller 180 may transmit the extracted event information to the external terminal 300 such that a notification screen 580 corresponding to the event information may be output from the external terminal 300 prior to a predetermined time from the closing time of an event corresponding to the even information.

If the event information is received, the controller 380 of the external terminal 300 may output the notification screen 580 corresponding to the event information to the touch screen 351 of the external terminal 300 prior to the predetermined time from the closing time of the event corresponding to the event information. An icon 582 corresponding to link information associated with screen information included in the event information may be displayed on the notification screen 580.

If the icon 582 is selected from the external terminal 300, the controller 180 of the mobile terminal 100 may output screen information 590, which is associated with link information corresponding to the icon 582, to the touch screen 151.

In addition, the aforementioned description of the present invention may be applied to all kinds of events (or event information) each of which has a closing time.

Hereinafter, the mobile terminal according to the present invention, which is the watch type mobile terminal described in FIG. 2, and the external terminal, which is the mobile terminal 100 described in FIGS. 1b and 1c, will be described exemplarily.

In the present invention, a notification screen corresponding to event information may be output to the touch screen 351 in various manners. Hereinafter, a method for controlling a notification screen will be described in more detail with reference to the accompanying drawings.

Figure 6A:
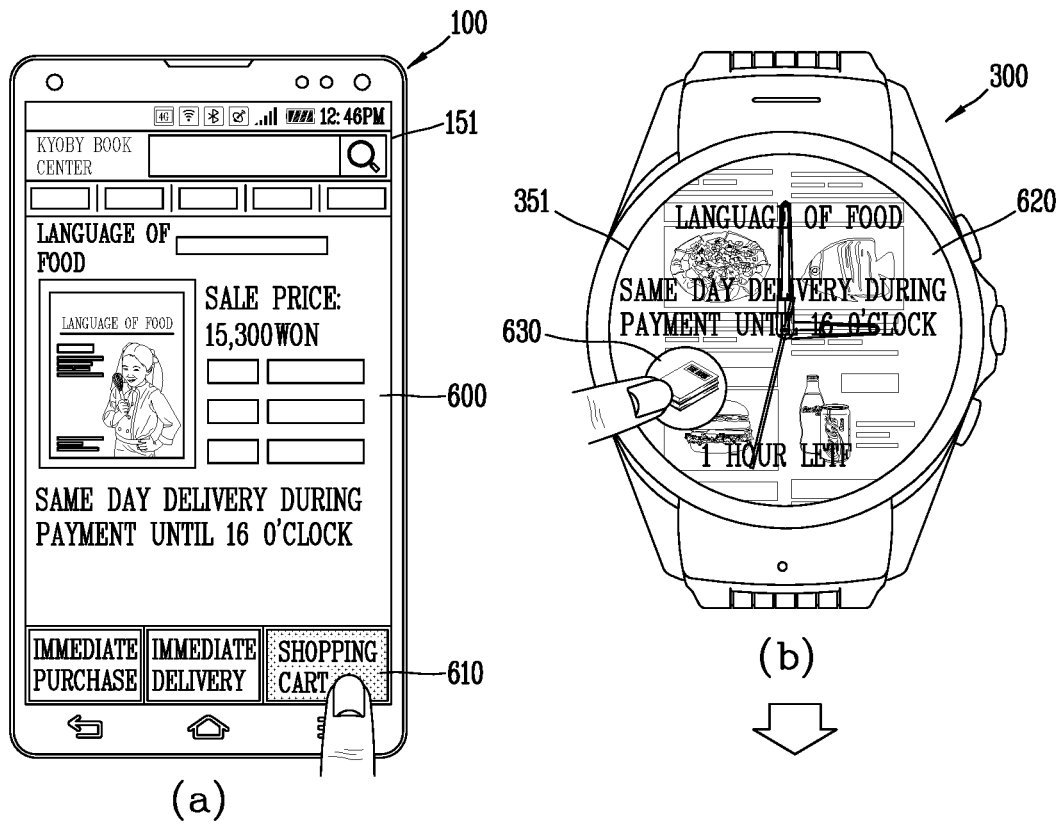
FIGS. 6a and 6b are conceptual views illustrating a control method based on event information received by a watch type mobile terminal from an external terminal.
Figure 6A:
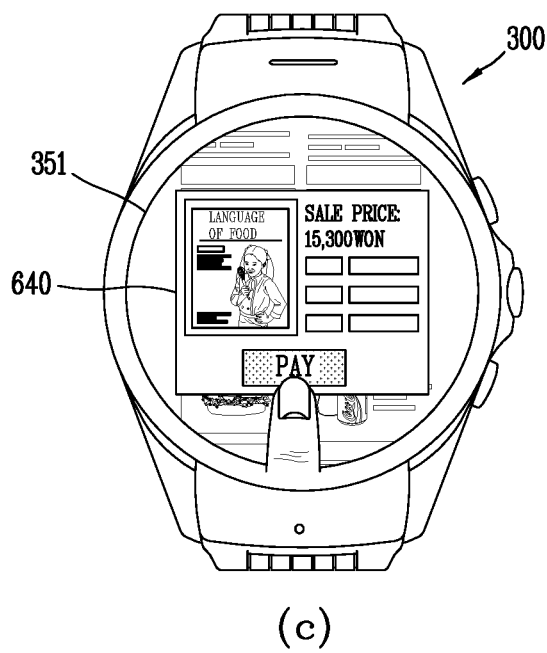
Figure 6B:
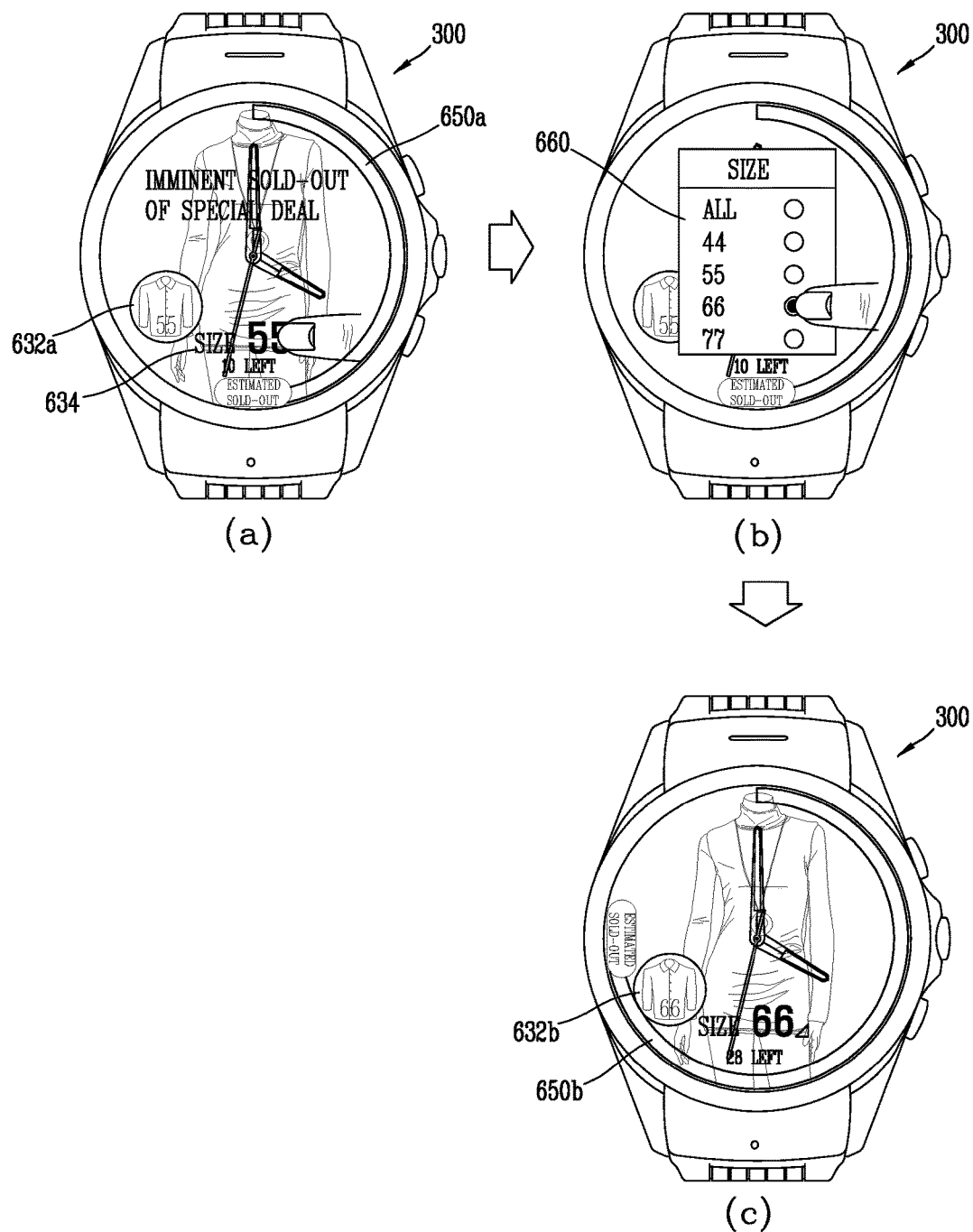

FIGS. 6a and 6b are conceptual views illustrating a control method based on event information received by a watch type mobile terminal from an external terminal.

The controller 180 may extract event information in various manners. For example, as shown in (a) of FIG. 6a, screen information 600 related to payment may be displayed on the touch screen 151. A graphic object 610 associated with a function of adding an item for payment to a shopping cart or wish list may be displayed on the screen information 600.

If the graphic object 610 is selected, the controller 180 may extract event information (for example, link information associated with the screen information 600, information related to the item for payment, information related to a closing time, etc.) included in the screen information 600 and transmit the extracted event information to the external terminal (watch type mobile terminal 300).

That is, the event information may include information (link information associated with the screen information 600, information related to the item for payment, information related to a closing time, etc.) related to payment.

The controller 380 of the watch type mobile terminal 300 may display the notification screen 620 corresponding to the event information on the touch screen 351 on the basis of information on the closing time, which is included in the event information, prior to a predetermined time from the closing time.

An icon 630 corresponding to information related to payment, which is included in event information, may be selected on the notification screen 620 as shown in (b) of FIG. 6a.

If the icon 630 is selected, the controller 380 of the watch type mobile terminal 300 may output information 640 related to payment, which is included in the event information, to the touch screen 380 as shown in (c) of FIG. 6a. Information related to an item (product) for payment and a button associated with a payment function may be displayed on the information 640 related to payment. A user may pay (purchase) the corresponding item by selecting the above button.

Meanwhile, an indicator 650a (or graphic object) indicating a sold-out estimated time of an item for payment may be displayed on the touch screen 351 of the watch type mobile terminal 300 as shown in (a) of FIG. 6b. Information on the sold-out estimated time may be received through the external terminal (mobile terminal 100) that has transmitted event information, and may be received from a device (for example, external server) provided in a place (shop, Internet shopping mall, etc.) that sells the item.

The sold-out estimated time may be calculated based on a buying (selling) speed of a corresponding item and the remainder of the corresponding item. The sold-out estimated time may be understood as the same/similar concept as/to the aforementioned closing time.

If the event information is received, the controller 380 may determine the item for payment on the basis of the information related to payment, which is included in the event information, and may control the touch screen 351 such that the notification screen corresponding to the event information may be displayed prior to a predetermined time from the sold-out estimated time which is externally received.

An icon 632a corresponding to the information related to payment may be displayed on the touch screen 351. Although not shown, if the icon 632a is selected, the controller 380 may output the information related to payment to the touch screen 351 as shown in (c) of FIG. 6a.

Also, a graphic object 634 that may change the item for payment may be displayed on the touch screen 351 as shown in (a) of FIG. 6b. If the graphic object 634 is selected, the controller 380 may display a changeable item list 660 on the touch screen 351 as shown in (b) of FIG. 6b.

If the item for payment is changed by a user through the graphic object 634 as shown in (c) of FIG. 6b, an indicator 350b indicating a sold-out estimated time of the changed item may be displayed on the touch screen 351.

If the sold-out estimated time of the item for payment, which is not changed, is different from the sold-out estimated time of the item for payment, which is changed, the indicators 350a and 350b may be displayed differently from each other.

Also, if the item for payment is changed, the controller 180 may display an icon 632b corresponding to information related to the changed item for payment.

If the icon 632b is selected, the controller 380 may output information related to payment, which enables payment of the changed item, to the touch screen 351.

Meanwhile, although not shown, if a current time reaches a time prior to a specific time from the sold-out estimated time, the controller 380 may generate an additional alarm. The additional alarm may include that alarm sound or vibration is generated in at least one of the watch type mobile terminal 300 and the mobile terminal 100, additional graphic effect (for example, flickering effect) is applied to the touch screen 351, or additional notification information is output.

The specific time may be the same as or shorter than a predetermined time when the notification screen is output. For example, if the predetermined time is 30 minutes and the specific time is 10 minutes, the controller 380 may output the notification screen corresponding to the event information to the touch screen 351 prior to 30 minutes from the sold-out estimated time of the item for payment, which is included in the event information, and may generate additional alarm prior to 10 minutes from the sold-out estimated time.

Through the aforementioned configuration, the present invention may provide a user interface that may output a notification screen prior to the predetermined time from the sold-out estimated time of the item for payment.

Hereinafter, various embodiments related to the watch type mobile terminal will be described in more detail with reference to the accompanying drawings.

FIGS. 7a, 7b, 7c, 7d, 7e, 8a, 8b and 9 are conceptual views illustrating various embodiments related to a watch type mobile terminal according to the present invention. The description made hereinafter may equally/similarly be applied to the bar type mobile terminal as well as the watch type mobile terminal.

The controller 380 may receive a plurality of kinds of event information through the wireless communication unit. A closing time (or sold-out estimated time of item for payment) of an event corresponding to event information may be included in each event information.

Figure 7A:
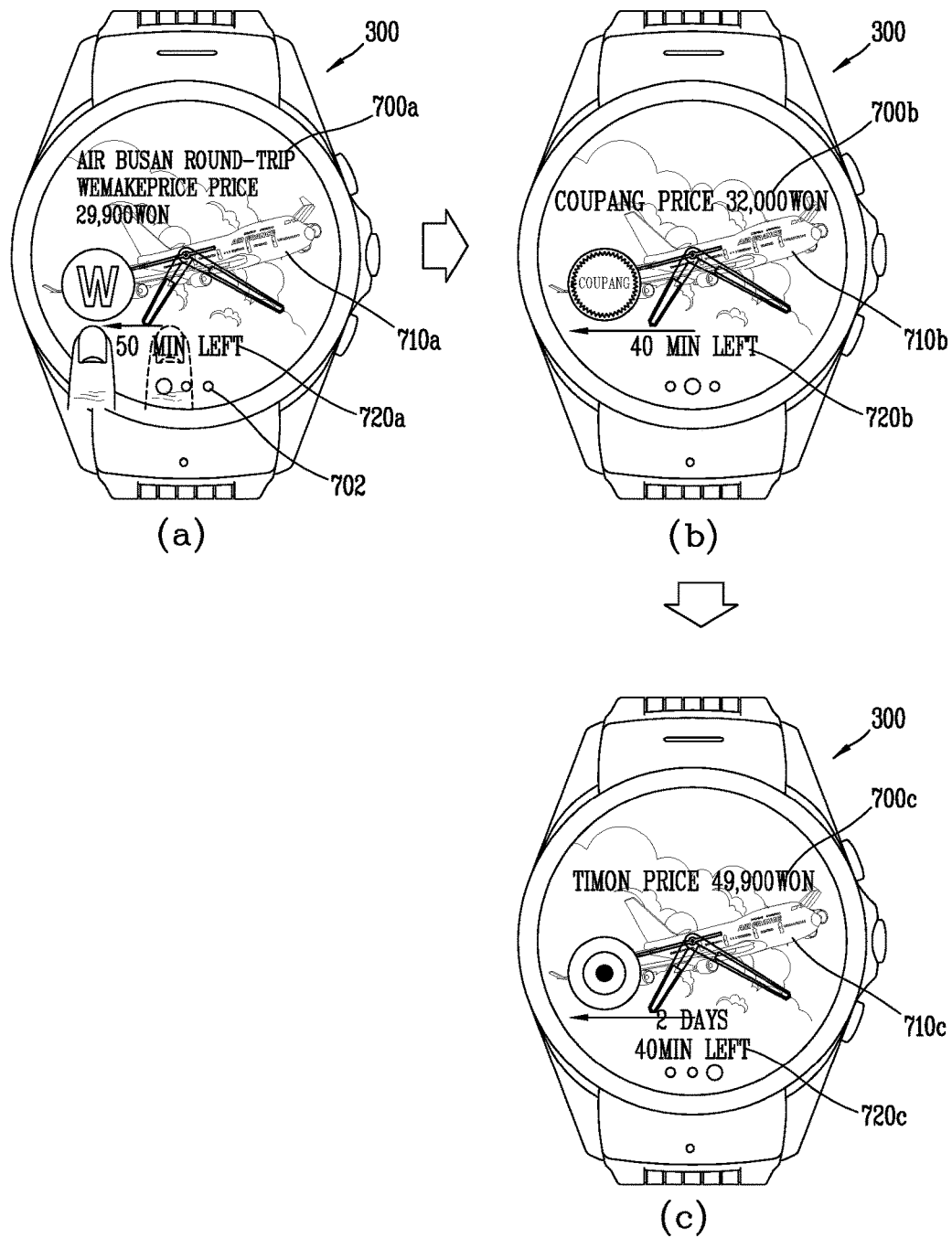
FIGS. 7a, 7b, 7c, 7d, 7e, 8a, 8b and 9 are conceptual views illustrating various embodiments related to a watch type mobile terminal according to the present invention.

The controller 380, as shown in (a) of FIG. 7a, may output a notification screen 700a corresponding to any one of the plurality of kinds of event information to the touch screen 351. The notification screen 700a may be output based on that the current time reaches a predetermined time from a closing time of an event corresponding to the any one kind of event information, or may be output based on a user request for outputting the notification screen 700a.

The controller 380 may perform different operations in accordance with a touch mode applied to the touch screen in a state that the notification screen corresponding to any one of the plurality of kinds of event information is output to the touch screen 351.

In more detail, if a first touch is applied to the touch screen 351, the controller 380 may change the notification screen corresponding to the one kind of event information to a notification screen corresponding to another event information.

Also, if a second touch different from the first touch is applied to the touch screen 351, the controller 380 may restrict the output of the notification screen corresponding to the one kind of event information and output a plurality of icons related to the plurality of kinds of event information to the touch screen 351.

Also, an indicator 702 indicating the number of the plurality of kinds of event information may be displayed on the touch screen 351.

For example, as shown in (a) of FIG. 7a, the notification screen 700a corresponding to any one of a plurality of kinds of event information may be output to the touch screen 351. The indicator 702 indicating the number of the plurality of kinds of event information may be displayed on the touch screen 351.

In a state that the notification screen 700a corresponding to the one kind of event information is output, if the first touch (for example, drag touch, swype touch, or flick touch) is applied to the touch screen 151, the controller 380, as shown in (b) of FIG. 7a, may change the notification screen 700a corresponding to the one kind of event information to a notification screen 700b corresponding to another kind of event information.

An output order for outputting the notification screens corresponding to the plurality of kinds of event information may be determined in various manners. For example, as shown in (a) to (c) of FIG. 7a, the controller 380 may output the notification screens on the basis of the first touch in the order of information related to payment, which is included in the event information, for example, lower prices 710a, 710b and 710c of items for payment.

For another example, although not shown, the controller 380 may output the notification screens on the basis of the first touch in the order of imminent closing times 720a, 720b and 720c of an event corresponding to event information.

Figure 7B:
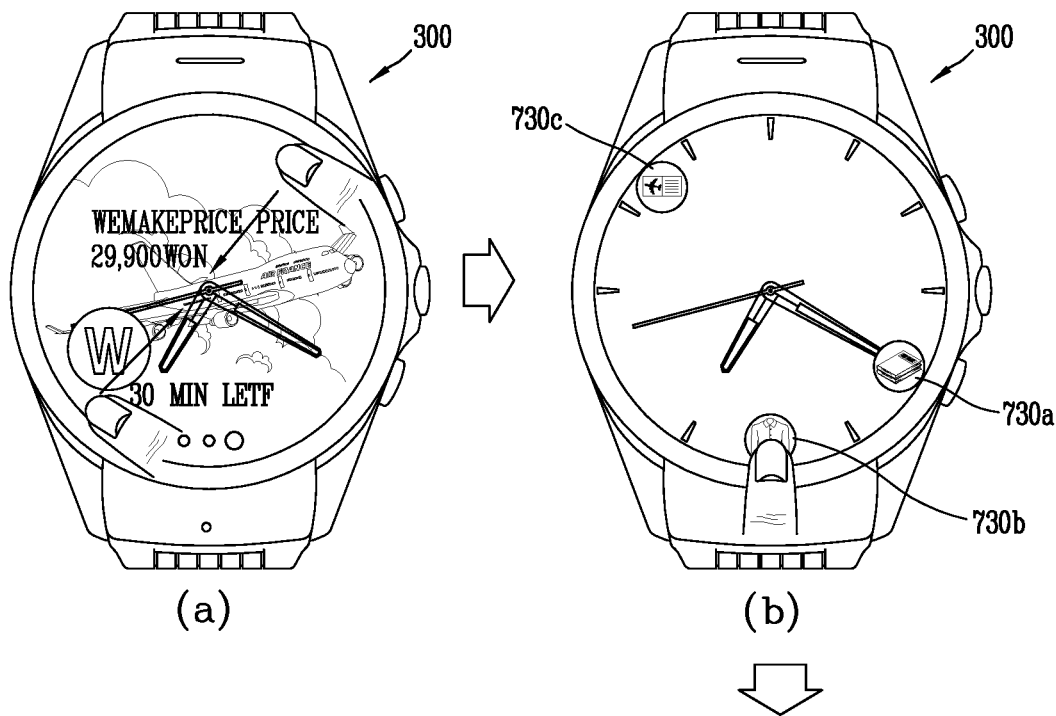
Figure 7B:
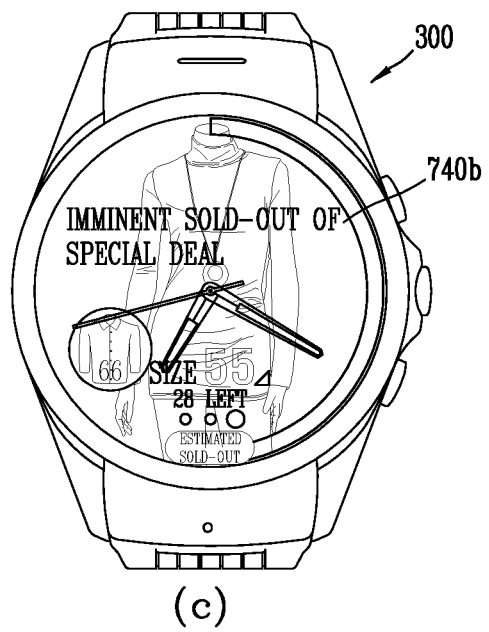

Meanwhile, as shown in (a) of FIG. 7b, in a state that the notification screen 700a corresponding to any one of a plurality of kinds of event information is output, if the second touch (for example, pinch-in touch or pinch-out touch) different from the first touch is applied to the touch screen 151, the controller 380 may restrict the output of the notification screen 700a corresponding to the one kind of event information. Afterwards, icons 730a, 730b and 730c corresponding to a plurality of kinds of event information may be displayed on the touch screen 351.

The positions where the icons corresponding to the plurality of kinds of event information are displayed may be determined on the basis of the closing time (sold-out estimated time of item for payment) of the event corresponding to the plurality of kinds of event information.

If any one of the plurality of icons is selected (touched), the controller 380, as shown in (c) of FIG. 7b, may output a notification screen 740b of the event information corresponding to the selected icon 730b to the touch screen 351.

Meanwhile, if additional event information is received through the wireless communication unit, the controller 380 may display the additional event information on the notification screen.

Figure 7C:
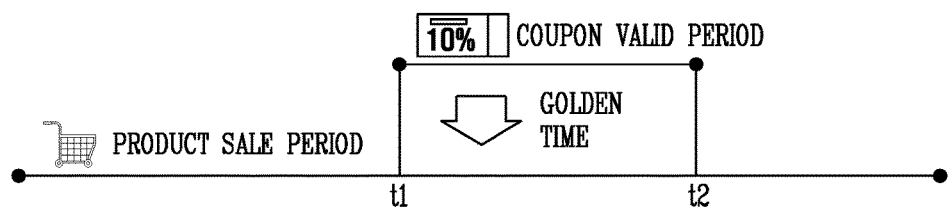
Figure 7C:
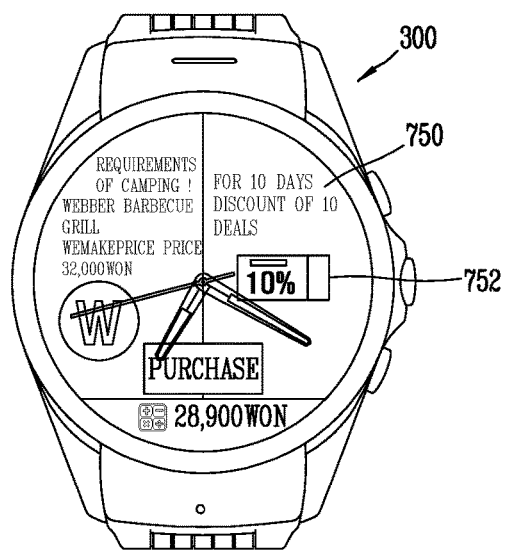

For example, as shown in (a) and (b) of FIG. 7c, in a state that notification information 750 corresponding to event information is output to screen information, if additional event information (for example, coupon information only valid between t1 and t2) is received from the external terminal 100 (or external server) through the wireless communication unit, the controller 380 may display the additional event information on the notification information 750.

The controller 380 may output a notification screen corresponding to previously received event information to the touch screen 351 based on that the additional event information is received. Also, if the additional event information is received in a state that the notification screen 750 corresponding to the event information is output to the touch screen 351, the controller 380 may display the additional event information in addition to the notification screen 750 which is previously output.

Figure 7D:
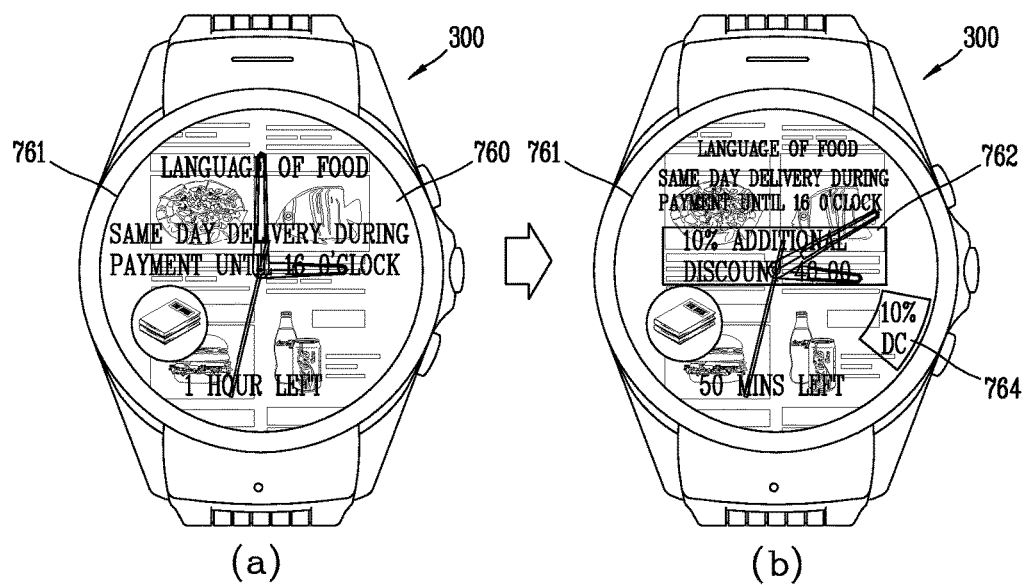

Likewise, as shown in (a) of FIG. 7d, in a state that a notification screen 760 corresponding to event information is displayed, if additional event information is received, the controller 380 may output a graphic object 764 indicating a valid time period of the additional event information to the touch screen 351. A message indicating the additional event information may be displayed on the graphic object 764.

Figure 7E:
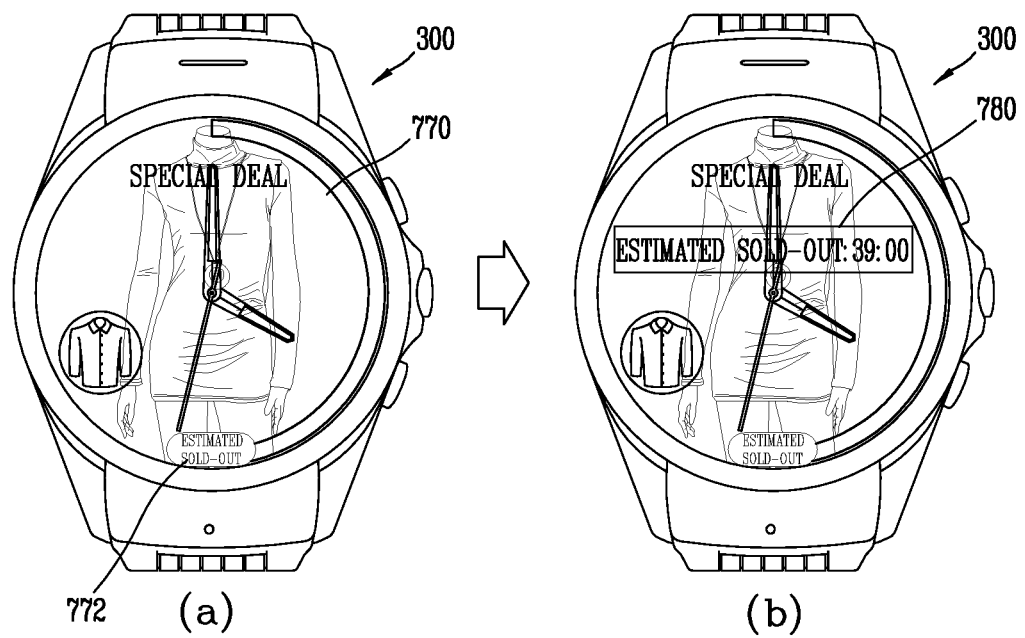

Referring to FIG. 7e, as described above with reference to FIGS. 6a and 6b, in a state that a notification screen 770 corresponding to event information is output to the touch screen 351, if a current time reaches a time prior to a specific time from a sold-out estimated time of an item for payment, which is included in the event information, the controller 380, as shown in (b) of FIG. 7e, may generated (output) additional alarm (for example, separate time information 780 remaining to reach the sold-out estimated time).

Figure 8A:
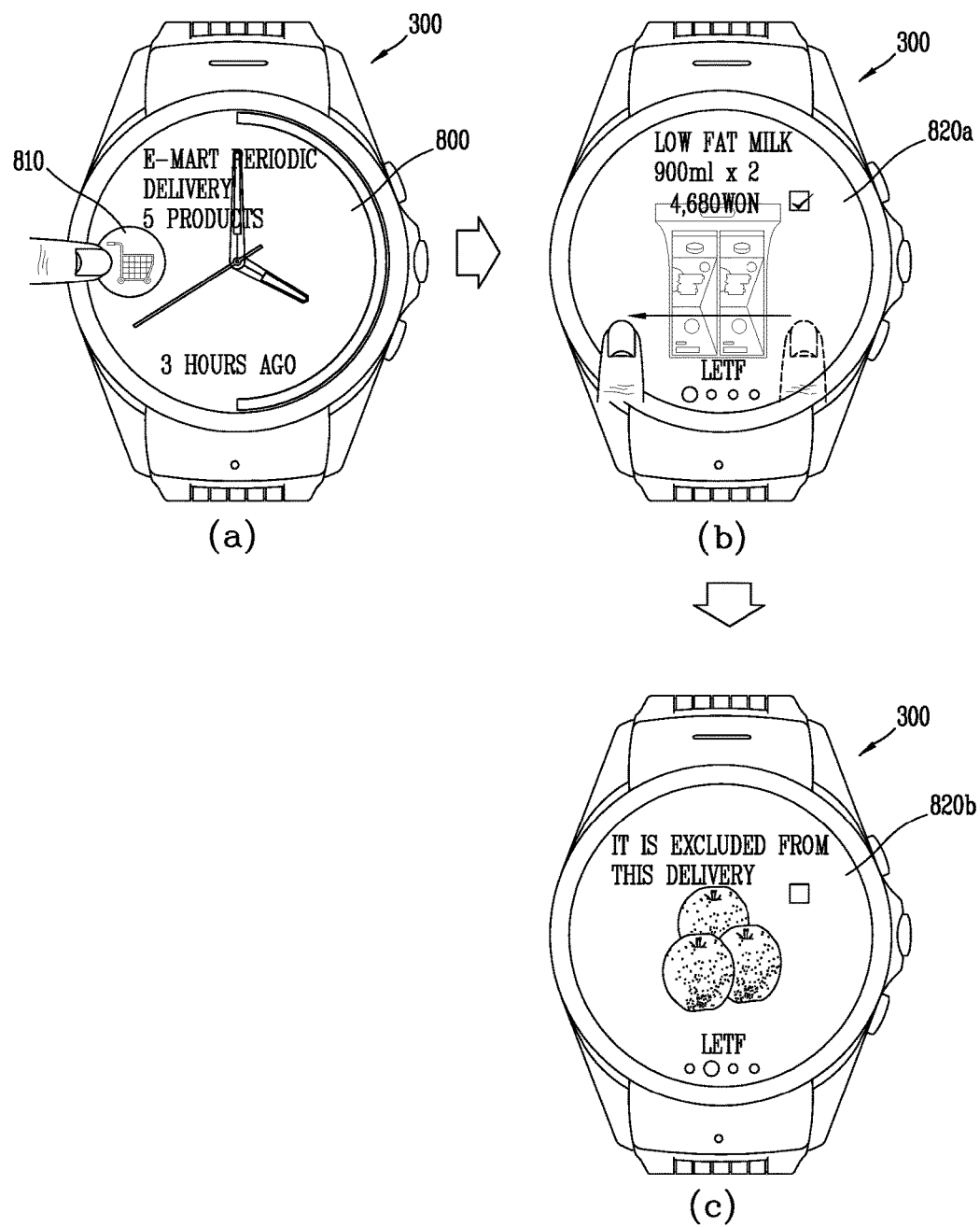
Figure 8B:
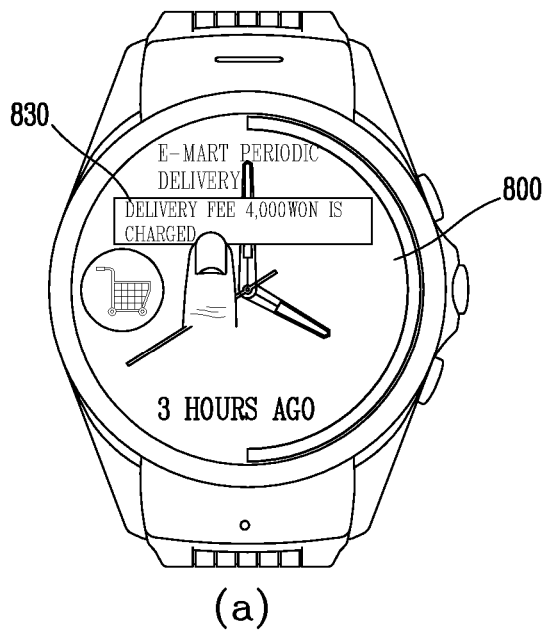
Figure 8B:
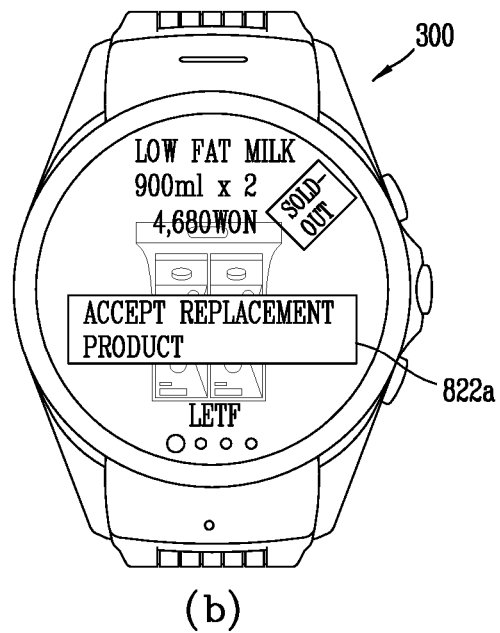
Figure 8B:
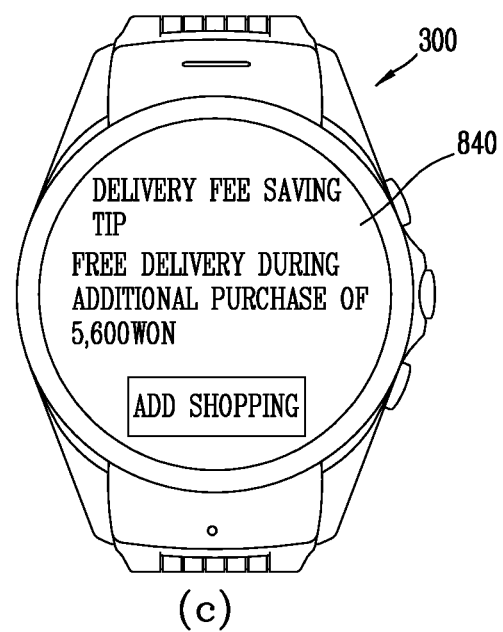

An embodiment related to a periodic delivery service for a purchase service of predetermined items per predetermined time (or day, date, time) is shown in FIGS. 8a and 8b.

As shown in (a) of FIG. 8a, a notification screen 800 indicating that at least one item designated by a user may periodically (regularly) be paid by the user per predetermined time (or day, date, time) previously set by the user may be output to the touch screen 351 of the watch type mobile terminal 300 (or mobile terminal 100).

The notification screen 800 may be output prior to a reference time from the predetermined time (closing time). The reference time may mean the predetermined time described in FIGS. 3 to 7e.

An icon 810 associated with a function of outputting screen information related to an item for periodic payment, that is, predetermined item may be displayed on the notification screen 800.

If the icon 810 is selected (touched), the controller 380, as shown in (b) of FIG. 8a, may output information 820a related to any one of predetermined items to the touch screen 351.

If a predetermined touch (for example, drag touch, swype touch, flick touch, etc.) is applied to the information 820a, the controller 380, as shown in (c) of FIG. 8a, may output information 820b related to another item to the touch screen 151.

A graphic object that may select whether to perform payment for a corresponding item may be displayed on the information related to items. If the graphic object is selected, the corresponding item may be a payment target, and if not so, the corresponding item may be excluded from a payment target.

Meanwhile, additional information 830 (for example, shipping cost (delivery cost)) related to payment may be displayed on the notification screen 800. If the additional information 830 is selected, the controller 380 may output a screen (information related to item that may be purchased additionally for discount of shipping cost) related to the additional information to the touch screen 351.

If the predetermined item is sold out, a graphic object 822a that may select a similar item (replacement item) may be displayed on the information related to items. If the graphic object 822a is selected, the similar item may be a payment target.

The similar item (replacement item) may be determined by a user, or may be determined on the basis of information stored in a database of an external server that provides the periodic delivery service.

Also, notification information 840 corresponding to the additional information may further be displayed on the touch screen 351. The notification information 840 may be output based on that the graphic object 822a shown in (b) of FIG. 8b is selected or a graphic object (not shown) associated with a payment function is selected.

Through the aforementioned configuration, a notification screen related to a predetermined event (periodic delivery) previously set per predetermined time may be provided to the user, and a user interface that may pay a predetermined item more simply through the notification screen may be provided.

Figure 9:
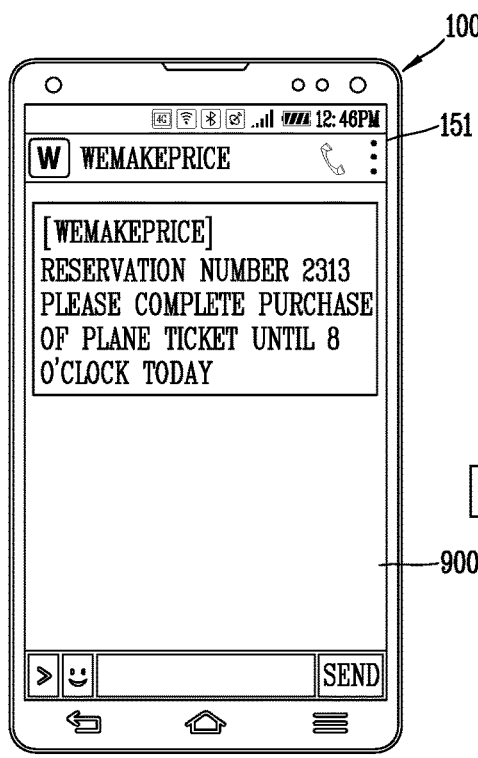
Figure 9:
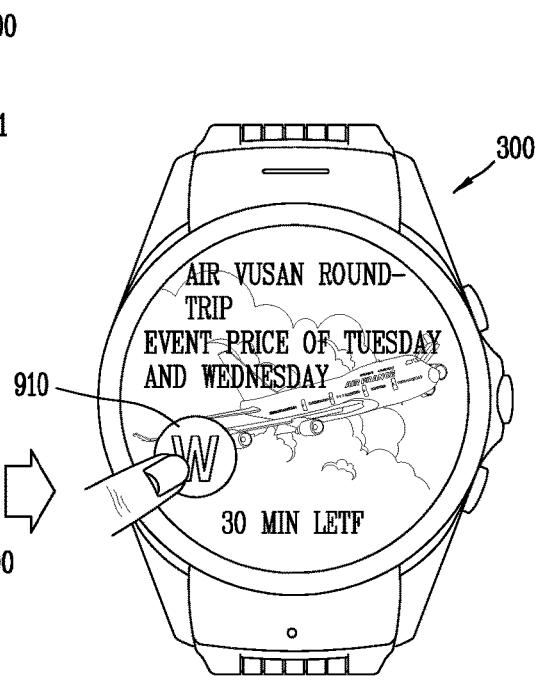
Figure 9:
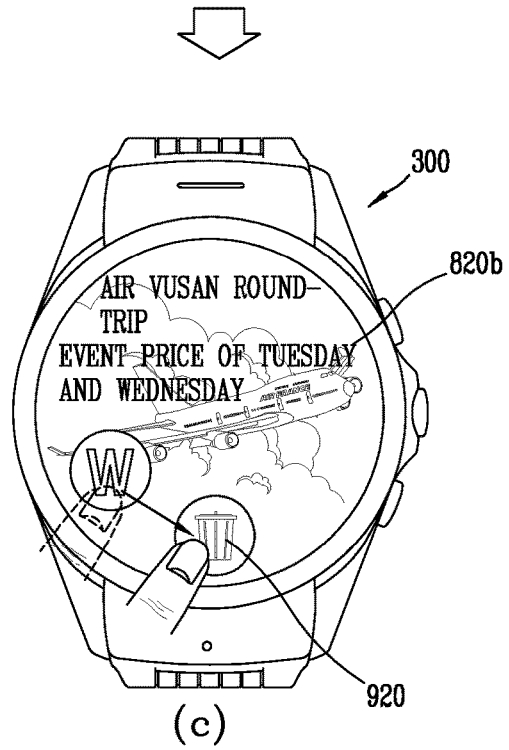

FIG. 9 is a diagram illustrating a method for deleting (releasing) a notification screen corresponding to event information.

As shown in (a) of FIG. 9, if a predetermined touch is applied to screen information 900 displayed on the touch screen 151 of the mobile terminal 100, the controller 180 may extract event information included in the screen information 900 and transmit the extracted event information to the external terminal (watch type mobile terminal) 300.

As shown in (b) of FIG. 9, the controller 380 of the watch type mobile terminal 300 may output a notification screen corresponding to the event information to the touch screen 351 of the watch type mobile terminal 300 on the basis of the received event information prior to a predetermined time from a closing time of an event corresponding to the event information.

An icon 910 corresponding to link information associated with screen information from which the event information is extracted may be displayed on the notification screen.

If a predetermined touch (for example, drag touch) is applied to the icon 910, the controller 180 may output a graphic object 920 associated with a function of releasing notification to the touch screen 351.

If the predetermined touch is released from the graphic object 920, the controller 380 may release notification of the event information. In this case, the notification screen corresponding to the event information, which is output to the touch screen 351, may disappear. Also, if notification of the event information is released, even though additional event information related to the event information is received, the controller 380 may not output the additional event information to the touch screen 351.

Through the aforementioned configuration, the present invention may provide a user interface that may release the notification screen more simply.

As described above, the present invention may provide the user interface that may more optimally output information related to an event selected by the mobile terminal from the external terminal, that is, wearable device.

Also, the present invention may provide the optimized user interface that may extract event information and transmit the extracted event information to the external terminal, whereby the notification screen corresponding to the event information may be output from the external terminal prior to the predetermined time from the closing time of the event.

Also, the present invention may provide the optimized UI/UX that may output the notification screen corresponding to event information on the basis of the event information transmitted from the external terminal prior to the predetermined time from the closing time of the event corresponding to the event information and perform various functions through the notification screen.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal adapted to communicate and control an external terminal, the mobile terminal comprising:
   a wireless communication unit that performs wireless communication with the external terminal;
   a touch screen for receiving a touch, and for outputting screen information; and
   a controller connected to the wireless communication unit and the touch screen, for extracting event information included in the screen information on the basis of a user request and transmitting the extracted event information to the external terminal, and for controlling the wireless communication unit to communicate with the external terminal to generate a notification screen corresponding to the event information prior to a predetermined time from a closing time of an event corresponding to the event information,
wherein when the screen information is captured after a predetermined touch is applied to the touch screen information output to the touch screen, the controller controls the touch screen to output a graphic object associated with a function of extracting event information, and
wherein the controller is further configured to:
determine event information displayed on an area to which the predetermined touch is applied to the screen information, and
extract the determined event information from the screen information based on a touch applied to the graphic object.

2. The mobile terminal according to claim 1, wherein the controller controls the touch screen to extract the event information on the basis of at least one of capturing for the screen information output to the touch screen and a predetermined touch applied to the screen information.

3. The mobile terminal according to claim 1, wherein the event information includes link information associated with the screen information, wherein the controller controls the wireless communication unit to communicate with the external terminal to output an icon corresponding to the link information to the notification screen corresponding to event information output to a touch screen of the external terminal, and wherein the controller controls the touch screen to output screen information associated with the link information to the touch screen on the basis of link information corresponding to the icon if the icon is selected from the external terminal.

4. The mobile terminal according to claim 1, wherein the controller controls the touch screen to output the notification screen corresponding to the event information prior to the predetermined time from the closing time of the event corresponding to the extracted event information.

5. The mobile terminal according to claim 4, wherein the controller controls the wireless communication unit to communicate with the external terminal to output an icon corresponding to link information associated with the screen information to the notification screen corresponding to the event information, and if the icon is selected, the controller outputs the screen information associated with the link information to the touch screen on the basis of the link information corresponding to the icon.

6. The mobile terminal according to claim 1, further comprising a main body configured to be worn on a wrist of a user.

7. The mobile terminal according to claim 1, wherein, if the event information is received from the external terminal, the controller controls the touch screen to output the notification screen corresponding to the event information prior to the predetermined time from the closing time of the event corresponding to the received event information.

8. The mobile terminal according to claim 7, wherein the controller controls the wireless communication unit to communicate with the external terminal to output an icon corresponding to link information associated with specific screen information to the notification screen corresponding to the event information, and if the icon is selected, the controller controls the wireless communication unit to communicate with the external terminal to transmit link information corresponding to the icon to the external terminal such that the specific screen information is output to the touch screen of the external terminal.

9. The mobile terminal according to claim 7, wherein the event information includes information related to payment, wherein the controller controls the wireless communication unit to communicate with the external terminal to output an icon corresponding to the information related to payment to the notification screen corresponding to the event information, and wherein the controller controls the touch screen to output the information related to payment to the touch screen based on that the icon corresponding to the information related to payment is selected.

10. The mobile terminal according to claim 9, wherein the controller controls the touch screen to display an indicator indicating a sold-out estimated time of an item for payment.

11. The mobile terminal according to claim 10, wherein the controller controls the touch screen to display a graphic object that may change the item for payment, and if the item for payment is changed through the graphic object, the controller controls the touch screen to display an indicator indicating a sold-out estimated time of the changed item.

12. The mobile terminal according to claim 10, wherein the controller generates an alarm if a current time reaches a time prior to a specific time from the sold-out estimated time.

13. The mobile terminal according to claim 6, wherein the controller receives a plurality of kinds of event information through the wireless communication unit, and performs operations in accordance with a touch mode applied to the touch screen when a notification screen corresponding to any one of the plurality of kinds of event information is displayed.

14. The mobile terminal according to claim 13, wherein the controller controls the touch screen to change the notification screen corresponding to a first event information to a notification screen corresponding to a second event information when a first touch is applied to the touch screen, and wherein the controller restricts output of the notification screen corresponding to the first event information, and wherein the controller controls the touch screen to output a plurality of icons related to different kinds of event information to the touch screen if a second touch different from the first touch is applied to the touch screen.

15. The mobile terminal according to claim 14, wherein the controller controls the touch screen to display an indicator indicating the number of the plurality of kinds of event information.

16. A method for controlling a mobile terminal, the mobile terminal operatively connected to an external terminal, the method comprising the steps of:
outputting screen information on a touchscreen of the mobile terminal;
extracting by a controller of the mobile terminal event information included in the screen information on the basis of a user request;
transmitting the extracted event information by a wireless communication unit to the external terminal; and
outputting a notification screen corresponding to the event information from the external terminal prior to a predetermined time from a closing time of an event corresponding to the event information,
wherein the step of extracting includes outputting a graphic object associated with a function of extracting event information if the screen information is captured after a predetermined touch is applied to the screen information output to the touch screen and extracting event information displayed on an area to which the predetermined touch is applied, from the screen information based on that a touch is applied to the graphic object,
wherein the step of extracting includes:
when the screen information is captured after a predetermined touch is applied to the touch screen information output to the touch screen, the controller controls the touch screen to output a graphic object associated with a function of extracting event information and,
wherein the controller is further configured to:
determine event information displayed on an area to which the predetermined touch is applied to the screen information, and
extract the determined event information from the screen information based on a touch applied to the graphic object.

17. The method according to claim 16, wherein the user request is at least one of capturing for the screen information output to the touch screen and a predetermined touch applied to the screen information.

18. The method according to claim 16, wherein the event information includes link information associated with the screen information, and further comprises the step of outputting to a notification screen an icon corresponding to the link information and corresponding to event information output to a touch screen of the external terminal, and the method further comprises the step of outputting screen information associated with the link information to the touch screen on the basis of link information corresponding to the icon if the icon is selected from the external terminal.

* * * * *